(12) United States Patent
Yamaguchi et al.

(10) Patent No.: US 8,461,790 B2
(45) Date of Patent: Jun. 11, 2013

(54) ROTARY ENCODER, ROTARY MOTOR, AND ROTARY MOTOR SYSTEM

(71) Applicant: Kabushiki Kaisha Yaskawa Denki, Kitakyushu (JP)

(72) Inventors: Yosuke Yamaguchi, Kitakyushu (JP); Yasushi Yoshida, Kitakyushu (JP); Shirou Yoshidomi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/682,738

(22) Filed: Nov. 21, 2012

(65) Prior Publication Data

US 2013/0076289 A1 Mar. 28, 2013

Related U.S. Application Data

(63) Continuation of application No. PCT/JP2011/051198, filed on Jan. 24, 2011.

(30) Foreign Application Priority Data

May 31, 2010 (JP) ................................. 2010-124762

(51) Int. Cl.
*H02K 29/10* (2006.01)
(52) U.S. Cl.
USPC .... 318/400.4; 318/577; 318/640; 318/400.16
(58) Field of Classification Search
USPC .......... 318/577, 640, 400.16, 400.4; 356/399, 356/401, 493, 494, 498, 499, 521
See application file for complete search history.

(56) References Cited

U.S. PATENT DOCUMENTS 5,537,210 A 7/1996 Kaneda et al.
5,696,374 A * 12/1997 Fukui et al. ............... 250/237 G (Continued)

FOREIGN PATENT DOCUMENTS

JP 64-072020 3/1989
JP 06-347293 12/1994

(Continued)

OTHER PUBLICATIONS

International Search Report for corresponding International Application No. PCT/JP2011/051198, Jul. 12, 2011.

(Continued)

*Primary Examiner* — Bentsu Ro
*Assistant Examiner* — Thai Dinh
(74) *Attorney, Agent, or Firm* — Ditthavong Mori & Steiner, P.C.

(57) ABSTRACT

The encoder includes a disk in a disk shape that is arranged rotatably about a rotation axis and that includes one track in a ring shape on which a rotating grating is formed and one or more origin detection areas serving as partial areas on which a rotating grating is formed, and a mask that is fixed and arranged in a manner facing the disk and on which one or more fixed gratings are formed so as to constitute a diffraction interference optical system together with the rotating gratings. A plurality of slits and included in at least one rotating grating are formed along a curved line obtained by curving a plurality of radial lines about the rotation axis in the circumferential direction at predetermined curvature such that pitches and of the slits and can be set to a predetermined value.

12 Claims, 11 Drawing Sheets

U.S. PATENT DOCUMENTS

| | | | |
|---|---|---|---|
| 6,198,534 | B1 | 3/2001 | Hofer et al. |
| 6,963,409 | B2 * | 11/2005 | Benner et al. ............... 356/616 |
| 7,132,647 | B2 * | 11/2006 | Atsuta et al. ............. 250/231.16 |
| 7,358,865 | B2 * | 4/2008 | Igaki et al. ..................... 341/13 |
| 7,973,941 | B2 * | 7/2011 | Tobiason .................... 356/499 |
| 8,148,674 | B2 | 4/2012 | Yoshida et al. |
| 8,345,259 | B2 * | 1/2013 | Parriaux et al. ............. 356/499 |
| 2009/0321621 | A1 | 12/2009 | Yoshida et al. |

FOREIGN PATENT DOCUMENTS

| | | |
|---|---|---|
| JP | 3509830 B2 | 5/1997 |
| JP | 10-090008 | 4/1998 |
| JP | 11-142114 | 5/1999 |
| JP | 2006-153597 | 6/2006 |
| WO | WO 2007/108398 | 9/2007 |

OTHER PUBLICATIONS

Written Opinion for corresponding International Application No. PCT/JP2011/051198, Jul. 12, 2011.

* cited by examiner

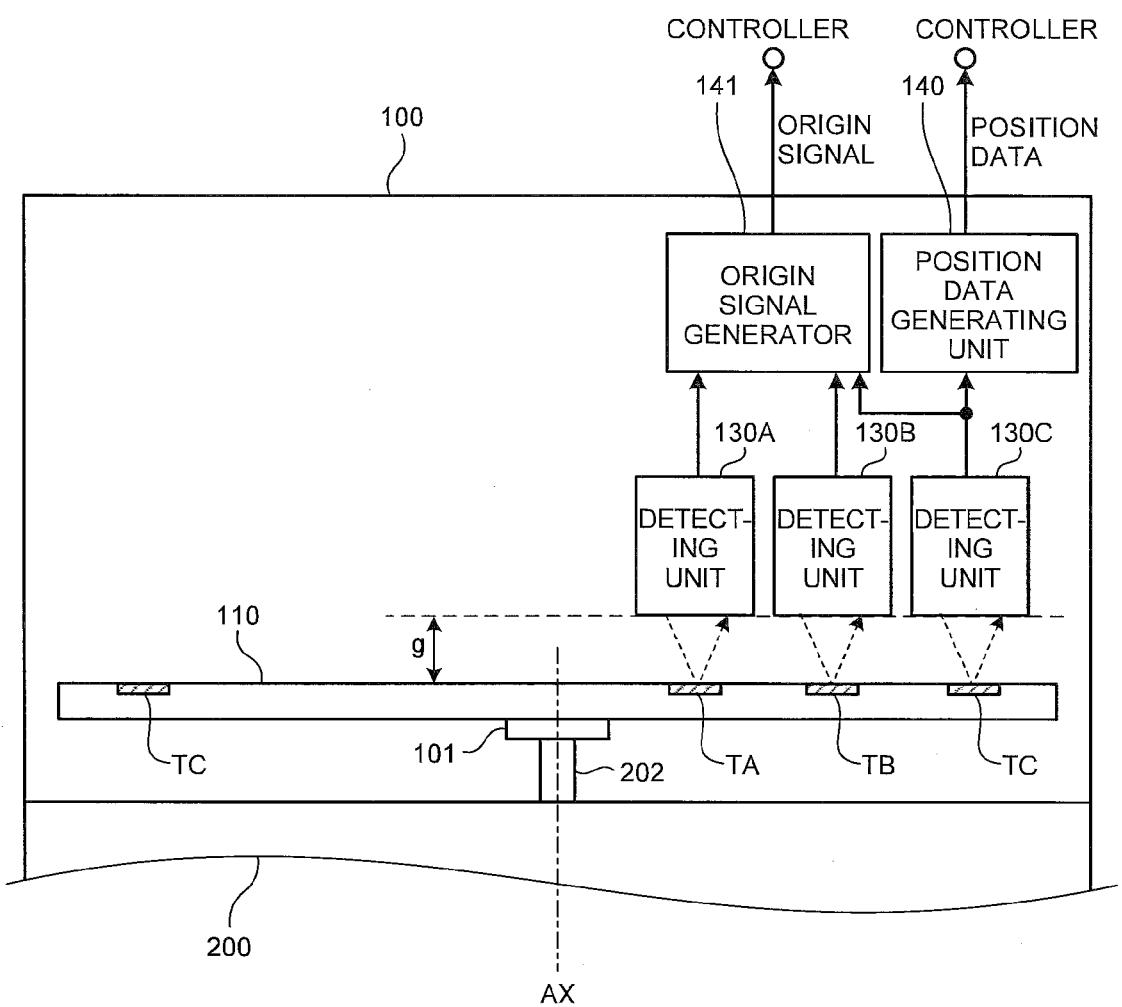

TO POSITION DATA GENERATING UNIT
OR ORIGIN SIGNAL GENERATOR

PERIODIC SIGNAL

ROTATION ANGLE θ
ORIGIN L SIGNAL

ROTATION ANGLE θ
ORIGIN H SIGNAL

ROTATION ANGLE θ
INCREMENTAL A SIGNAL

ROTATION ANGLE θ
ORIGIN SIGNAL

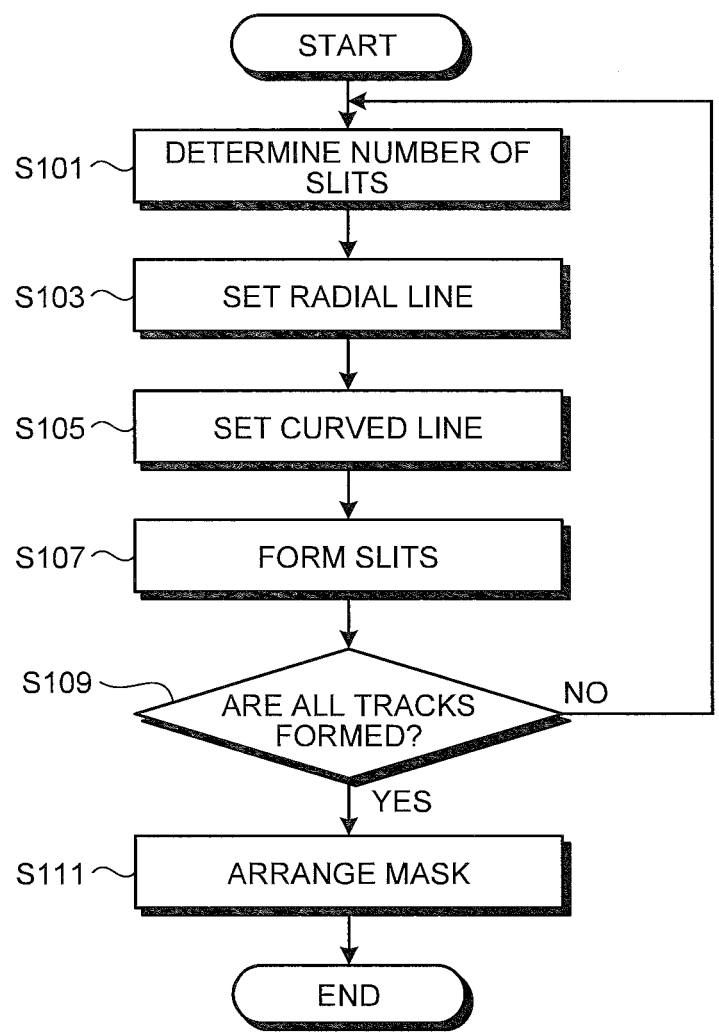

ROTARY ENCODER, ROTARY MOTOR, AND ROTARY MOTOR SYSTEM

CROSS-REFERENCE TO RELATED APPLICATIONS

This application is a continuation of PCT international application Ser. No. PCT/JP2011/051198 filed on Jan. 24, 2011 which designates the United States, and which claims the benefit of priority from Japanese Patent Application No. 2010-124762, filed on May 31, 2010; the entire contents of which are incorporated herein by reference.

FIELD

The present invention relates to a rotary encoder, a rotary motor, and a rotary motor system.

BACKGROUND

Encoders have been used for measuring physical quantities, such as the position and velocity of a moving body.

Encoders are classified broadly into rotary-type (hereinafter, also referred to as "rotary") encoders and linear-type (hereinafter, also referred to as "linear") encoders depending on the direction of movement of a moving body.

Rotary encoders are also referred to as rotational position detecting devices, for example, and detect the position (angle) and velocity (rotational velocity) of a moving body (a rotating body). By contrast, linear encoders are also referred to as linear position detecting devices, for example, and detect the position and velocity of a moving body.

Non-contact encoders are classified broadly into "magnetic (including resolvers)" encoders and "optical" encoders depending on their detection principle and the like. Magnetic encoders have characteristics of excellent environmental resistance compared with optical encoders, for example. Optical encoders have characteristics of excellent position resolution compared with magnetic encoders, for example. Furthermore, there have also been developed encoders (also referred to as "hybrid" encoders) using both magnetism and light so as to provide the characteristics of both encoders.

Furthermore, encoders are classified broadly into incremental-type (hereinafter, also referred to as "incremental") encoders and absolute-type (hereinafter, also referred to as "absolute") encoders depending on their position detection method and the like. Incremental encoders mainly detect the relative position of a moving body with respect to an origin position. Specifically, incremental encoders detect an origin position in advance and acquire a periodic signal, such as a pulse signal, corresponding to movement from the origin position. Subsequently, incremental encoders perform processing of integration of the periodic signal, thereby detecting the position, for example. By contrast, absolute encoders are also referred to as absolute value encoders and detect the absolute position of a moving body.

Each type of encoder among the various types of encoders described above is appropriately selected and used depending on characteristics required for intended uses. In particular, encoders play an important role in servomotors (including rotary motors and linear motors), which perform control, such as position control and velocity control, grasping a present position, for example. In other words, performance and characteristics of an encoder selected and used in a motor can influence performance and characteristics of the motor.

An optical encoder will be explained below.

As optical encoders, there have been developed encoders in which a grating formed of a plurality of slits (including reflective and transmissive) is used. Encoders using the optical grating are classified broadly into "geometrical optical" that uses light simply transmitted through or reflected from the grating and "diffraction interference optical" that uses diffraction interference light obtained by a plurality of gratings (Japanese Patent No. 3509830 and Japanese Patent Application Laid-open No. H6-347293).

The geometrical optical encoder receives light reflected by or transmitted through the slits forming the grating without causing the light to be diffracted and interfered and specifies the positional change and the like on the basis of the number of times the light is received and the like. This geometrical optical encoder has characteristics that the detection accuracy is easy to decrease as the distance (hereinafter, also referred to as a "gap g") between one grating and another grating, a light receiving unit, or the like becomes larger when the slit intervals (hereinafter, also referred to as a "pitch p") in the grating is made constant.

On the other hand, the diffraction interference optical encoder uses diffraction interference light obtained by a plurality of gratings and specifies the positional change and the like on the basis of the number of times the diffraction interference light is received and the like. Therefore, this diffraction interference optical encoder can improve the S/N ratio (Signal to Noise Ratio) compared with the geometrical optical encoder. Moreover, the diffraction interference optical encoder has characteristics that the detection accuracy is less likely to be affected even when the gap g is set relatively long. This means that the environmental resistance such as against impact can be improved by reducing the possibility of causing a mechanical interference between components. In this manner, the diffraction interference optical encoder is more advantageous than the geometric optics encoder.

However, in the diffraction interference optical encoder, because a diffraction interference optical system needs to be formed, the pitch p for each of a plurality of gratings (diffraction gratings) and the gap g that is an interval between the gratings are set to appropriate values. The relationship between the pitch p and the gap g restricts development and manufacturing of the encoder itself. That means that if the pitch p or the gap g is changed from an appropriate value, the quality of diffraction interference light decreases and the S/N ratio of a periodic signal to be detected decreases. On the other hand, in order to maintain the pitch p or the gap g to an appropriate value, the diffraction interference optical system needs to be designed and developed in consideration of the periodic numbers of a periodic signal, the formation position of slits, and the like in addition to the pitch p and the gap g.

Accordingly, flexibility decreases and therefore designing and development are not easy. Moreover, because adjustment is needed for each of a plurality of diffraction interference optical systems, the diffraction interference optical encoder is difficult to manufacture. Furthermore, such restrictions on the designing and development make it difficult to downsize the device itself.

The restrictions on designing, development, and manufacturing may be imposed even when one diffraction interference optical system is used for obtaining one periodic signal. However, particularly, when a plurality of diffraction interference optical systems is used for obtaining an origin signal, for example, in the case of an incremental encoder, designing, development, and manufacturing need to be performed for each of the diffraction interference optical systems, therefore, the degree of restrictions on them further increases.

For example, an optical encoder that obtains an origin signal by a diffraction interference optical system is disclosed (PCT Publication No. WO07/108,398).

This optical encoder includes a rotary slit for origin phase consisting of linear slit patterns arranged in parallel at equal pitches in a rotary disk, and a light source slit for origin phase consisting of linear slit patterns arranged in parallel at equal pitches and a fixed slit for origin phase are included in a fixed scale for origin phase.

The rotary slit for origin phase is irradiated with irradiation light from a light source through the light source slit for origin phase. Reflected light from the rotary slit for origin phase is passed through the fixed slit for origin phase and detected by a light receiving element and an origin signal is created from its detection signal.

However, in this detection method, a sharper signal needs to be obtained to obtain a highly accurate origin signal. In order to obtain a sharper signal, the area of the rotary slit for origin phase and the light receiving surface need to be increased. Accordingly, it is difficult to achieve both downsizing and high accuracy.

SUMMARY

A rotary encoder according to one aspect of an embodiment includes a disk in a disk shape and a mask. The disk is arranged rotatably about a rotation axis. And the disk includes one or more tracks in a ring shape on which an optical rotating grating is formed on whole circumference and one or more origin detection areas serving as partial areas on which an optical rotating grating is formed and that are offset from the rotation axis. The mask is fixed and arranged in a manner facing the disk and on which two or more optical fixed gratings capable of constituting a diffraction interference optical system together with each of the rotating grating of the tracks and the rotating grating of the origin detection areas are formed. A plurality of slits included in the rotating grating of the origin detection areas are inclined slits formed in a manner inclined in a circumferential, direction with respect to radial lines about the rotation axis or curved slits curved in the circumferential direction with respect to the radial lines about the rotation axis.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 2 is a view for explaining a configuration of a rotary encoder according to the embodiment.

FIG. 9 is a flowchart for explaining a method for manufacturing the rotary encoder according to the embodiment.

DESCRIPTION OF EMBODIMENTS

Figure 1:
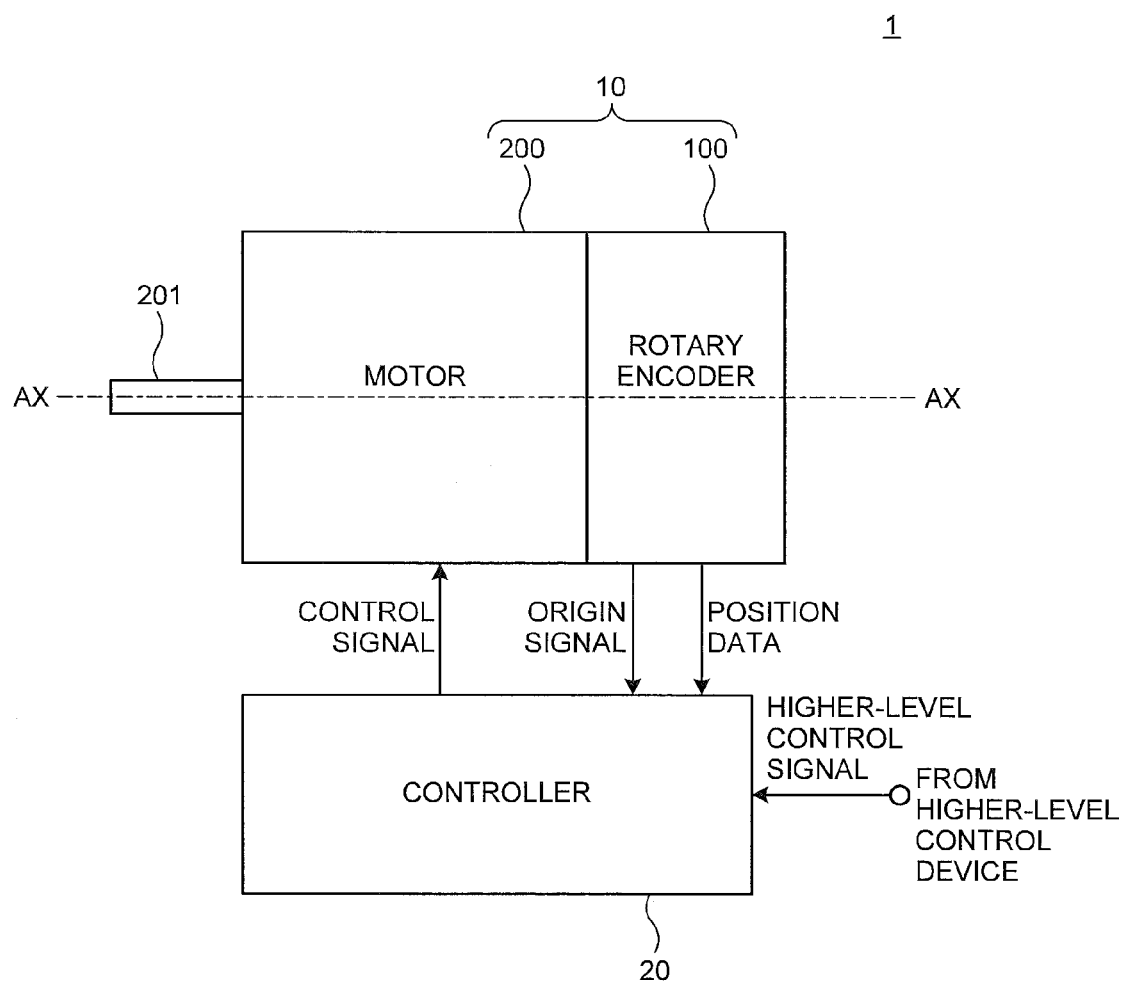
FIG. 1 is a view for explaining a configuration of a rotary motor system according to a first embodiment of the present invention.

Embodiments according to the present invention are described below in greater detail with reference to the accompanying drawings. In the present specification and the drawings, components having substantially the same functions are represented by the same reference numeral in principle, and an overlapping explanation of these components will be omitted as appropriate.

In each embodiment of the present invention described below, an explanation will be made of a rotary motor system including an incremental rotary encoder, for example. In other words, a rotary encoder according to each embodiment is applied to a rotary motor and detects a rotation angle θ of the rotary motor as a position x and an origin position as an origin z. However, it goes without saying that the rotary encoder according to each embodiment described herein can be applied to various rotating bodies that rotate about a certain rotation axis, such as a motor and a steering.

To facilitate understanding of the embodiments of the present invention, an explanation will be made in the following order:

<1. First Embodiment>
(1-1. Rotary Motor System According to First Embodiment)
(1-2. Rotary Encoder According to First Embodiment)
(1-2-1. Disk 110)
  (Tracks TA to TC)
  (Shape of Slit S)
(1-2-2. Detecting Units 130A to 130C)
  (Optical Detection Mechanism)
(1-2-3. Structure of Curved Slit)
  (Curved Slit in One Track T)
  (Positional Relationship between Curved Slit and Slit on Fixed Grating Side)

(Curved Slit in Relationship among a Plurality of Tracks)
(1-2-4. Position Data Generating Unit 140)
(1-2-5. Origin Signal Generator 141)
(1-3. Operation of Rotary Motor System According to First Embodiment)
(1-4. Method for Manufacturing Rotary Encoder According to First Embodiment)
(1-5. Example of Advantageous Effects of Rotary Encoder System According to First Embodiment)<
<2. Second Embodiment>
<3. Third Embodiment>
<4. Fourth Embodiment>

1. First Embodiment

1-1. Rotary Motor System According to First Embodiment

A configuration of a rotary motor system according to a first embodiment of the present invention will now be described with reference to FIG. 1. FIG. 1 is a view for explaining a configuration of the rotary motor system according to the first embodiment of the present invention.

As illustrated in FIG. 1, a rotary motor system (hereinafter, also simply referred to as a "motor system") 1 according to the present embodiment includes a rotary motor 10 and a controller 20. The rotary motor 10 includes a rotary encoder (hereinafter, also simply referred to as an "encoder") 100 and a motor 200.

The motor 200 is an example of a power generating source that does not include the encoder 100. The motor 200 may be simply referred to as a motor. The motor 200 includes a rotating shaft 201 on at least one side and rotates the rotating shaft 201 about a rotation axis AX, thereby outputting torque.

The motor 200 is not particularly restricted as long as the motor 200 is a servomotor controlled based on position data. Furthermore, the motor 200 is not limited to an electric motor unit that uses electricity as a power source and may be a motor unit that uses another power source, such as a hydraulic motor unit, a pneumatic motor unit, and a steam motor unit. However, an explanation will be made of the case where the motor 200 is an electric motor unit for convenience of description.

The encoder 100 is arranged on the motor 200 on the side opposite to the rotating shaft 201 and is connected to another rotating shaft (a rotating shaft 202 illustrated in FIG. 2) that rotates in association with the rotating shaft 201. By detecting the position of the rotating shaft 202, the encoder 100 detects a position x of the rotating shaft 201 from which torque is output (also referred to as a rotation angle θ or a position x of the motor 200, for example) and outputs position data indicating the position x and an origin signal indicating an origin z.

In addition to or instead of the position x of the motor 200, the encoder 100 may detect at least one of velocity v of the rotating shaft 201 (also referred to as rotational velocity, angular velocity, or velocity v of the motor 200, for example) and acceleration a of the rotating shaft 201 (also referred to as rotation acceleration, angular acceleration, or acceleration a of the motor 200, for example). In this case, the velocity v and the acceleration a of the motor 200 can be detected by differentiating the position x once or twice with respect to time or counting a periodic signal, which will be described later, at a predetermined interval, for example. An explanation will be made of the case where a physical quantity detected by the encoder 100 is the position x for convenience of description.

The position at which the encoder 100 is arranged is not particularly restricted. For example, the encoder 100 may be arranged in a manner directly connected to the rotating shaft 201 or may be connected to a rotating body, such as the rotating shaft 201, via another mechanism, such as a reducer and a rotation direction converter.

The controller 20 acquires position data output from the encoder 100 and controls rotation of the motor 200 based on the position data. Therefore, in the present embodiment where an electric motor unit is used as the motor 200, the controller 20 controls rotation of the motor 200 by controlling an electric current, voltage, or the like applied to the motor 200 based on the position data. Furthermore, the controller 20 can acquire a higher-level control signal from a higher-level control device (not illustrated) to control the motor 200 such that a position, velocity, or the like indicated by the higher-level control signal is output from the rotating shaft 201 of the motor 200. If the motor 200 uses another power source, such as hydraulic pressure, air, and steam, the controller 20 can control rotation of the motor 200 by controlling supply of the power sources.

1-2. Rotary Encoder According to First Embodiment

Figure 3A:
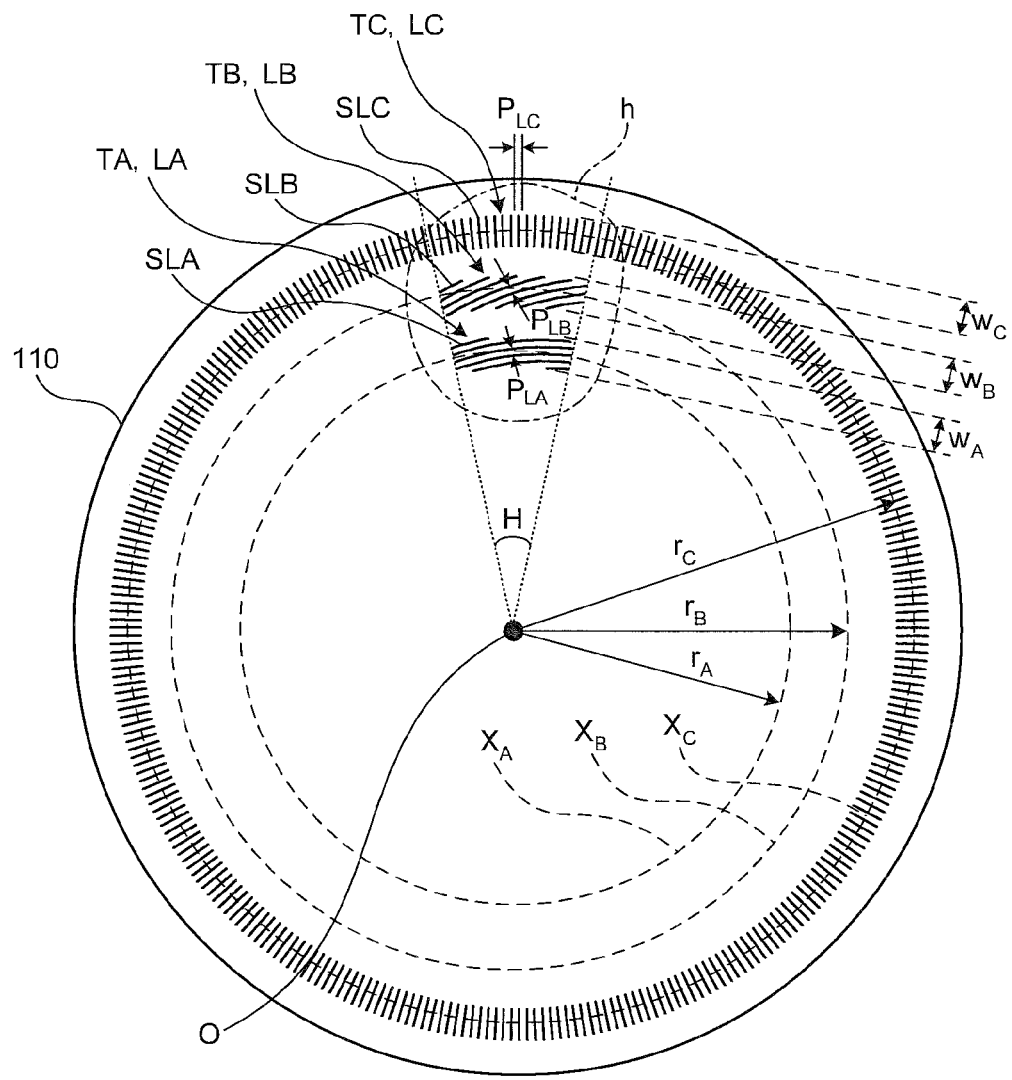
FIG. 3A is a view for explaining a disk provided to the rotary encoder according to the embodiment.

A configuration of the encoder 100 according to the present embodiment will now be described with reference to FIG. 2 and FIG. 3A. FIG. 2 is a view for explaining a configuration of a rotary encoder according to the present embodiment. FIG. 3A is a view for explaining a disk provided to the rotary encoder according to the present embodiment.

As illustrated in FIG. 2, the encoder 100 according to the present embodiment includes a rotating shaft 101, a disk 110, detecting units 130A to 130C, a position data generating unit 140, and an origin signal generator 141.

(1-2-1. Disk 110)

As illustrated in FIG. 3, the disk 110 is formed in a disk-shape and is arranged such that a disk center O is nearly coincident with the rotation axis AX. The disk 110 is connected to the rotating shaft 202 corresponding to the rotating shaft 201 of the motor 200 via the rotating shaft 101 that is rotatable about the rotation axis AX. Therefore, the disk 110 is arranged in a manner rotatable about the rotation axis AX in association with rotation of, the motor 200.

As illustrated in FIG. 3A, the disk 110 includes tracks TA to TC.

Because the incremental encoder 100 is explained as an example in the present embodiment, the disk 110 includes the track TC for detecting the position x in rotation of the motor 200 and two tracks TA and TB for accurately detecting the origin z. The number of tracks T is not limited to three and is set in plurality as appropriate in accordance with detection accuracy and signal processing required for the origin z.

(Tracks TA to TC)

Figure 3B:
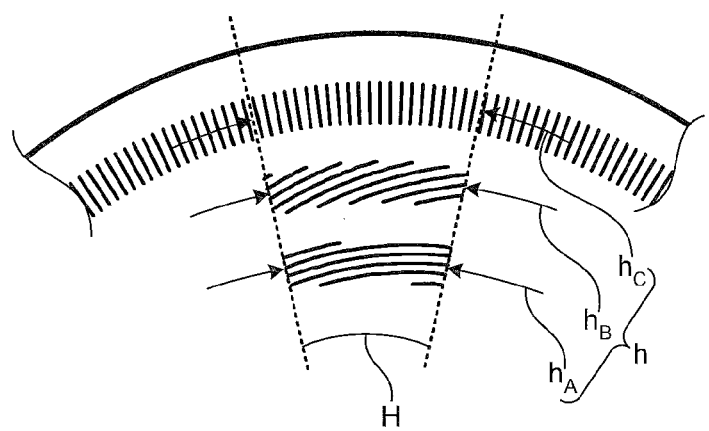
FIG. 3B is another view for explaining the disk provided to the rotary encoder according to the embodiment.

As illustrated in FIG. 3A, the track TC is formed in a ring-shape on the whole circumference about the disk center O of the disk 110. The tracks TA and TB are formed in origin detection areas hA and hB of lengths in the circumferential direction with respect to a predetermined origin detection area reference angle H in an arc about the disk center O of the disk 110. In the present embodiment, as illustrated in FIG. 3B, origin detection areas hA to hC of the tracks TA to TC are also collectively referred to as an "origin detection area h".

While the origin detection areas hA to hC of the tracks TA to TC are each formed within a range of a length in the circumferential direction with respect to the same origin detection area reference angle H in the present embodiment, the origin detection areas hA to hC may be formed with respect to different origin detection area reference angles H.

The tracks TA to TC are formed in predetermined widths wA to wC, respectively. In the present embodiment, the widths wA to wC of the tracks TA to TC are set to the same width w (w=wA=wB=wC). While the widths wA to wC of the tracks TA to TC are the same width in the present embodiment, the widths wA to wC are different from one another.

The tracks TA to TC are arranged such that the positions thereof at the center of the width w in the radial direction (track radii rA to rC) are different from one another. In other words, the tracks TA to TB are formed on concentric circles about the disk center O, and the tracks TA, TB, and TC are arranged from the disk center O toward the outer periphery in order of TA, TB, and TC (rA<rB<rC). Concentric measuring circles XA to XC based on the track radii rA to rC are also collectively referred to as a "measuring circle X".

As illustrated in FIG. 3A, optical rotating gratings LA to LC (rotating optical diffraction gratings) are formed on the tracks TA to TC, respectively.

The rotating gratings LA to LC include a plurality of optical slits SLA to SLC, respectively, and each form a part of an individual diffraction interference optical system independent of one another.

The slits SLA to SLC are each formed in a manner reflecting light (a reflecting slit) or in a manner transmitting light (a transmitting slit).

If a slit SL is formed as a reflecting slit, the slit SL may be formed by depositing a material having high reflectance, for example. By contrast, portions other than the slits SLA to SLC on the disk 110 may be formed by arranging a material that absorbs light with a method, such as vapor deposition, or using a material that transmits light for the disk 110 itself, for example. The slit SL can also be formed by using a material that reflects light for the disk 110 itself and processing the portions other than the slits SLA to SLC by etching, for example. Furthermore, the slits can be formed as phase diffraction gratings by forming both the slits SLA to SLC and the portions other than the slits SLA to SLC with a material having high reflectance and providing differences in level in a gap direction between the slits SLA to SLC and the portions other than the slits SLA to SLC.

By contrast, if the slit SL is formed as a transmitting slit, the slit SL may be formed by forming the disk 110 itself with a material that transmits light and by arranging a material that absorbs or reflects light to block light or performing processing for blocking light on the portions other than the slits SLA to SLC, for example. The method for forming the slits SLA to SLC is not restricted in particular.

In other words, if the slit SL is a reflecting slit, the slits SLA to SLC reflect light, and the portions other than the slits SLA and SLC do not reflect light. By contrast, if the slit SL is a transmitting slit, the slits SLA to SLC transmit light, and the portions other than the slits SLA and SLC block light.

In the present embodiment, an explanation will be made of the case where the slits SLA to SLC of the tracks TA to TC on the disk 110 are reflecting slits for convenience of description. If reflecting slits are used for the disk 110 in this manner, a reflective diffraction interference optical system can be formed. As a result, it is possible to reduce noise and influence on detection accuracy caused by fluctuation in a gap g between the disk 110 and a mask 120, which will be described later, compared with the case where transmitting slits are used for the disk 110.

The area division numbers nA to nC of the origin detection areas hA to hC by the slits SLA to SLC arranged in the circumferential direction on the tracks TA to TC, respectively, are set to different numbers from one another. The area division numbers nA to nC correspond to the number of slits obtained by counting the number of slits SLA to SLC, respectively, along the circumferential direction (measuring circle X) in the origin detection area h. Therefore, the area division numbers nA to nC, that is, the numbers of slits arranged along the circumferential direction in the origin detection area h are set to different numbers from one another. The tracks TA to TC are preferably formed such that the area division numbers nA to nC in the origin detection area h increase as the track radii rA to rC increase. In other words, because the track radii are set in a manner satisfying "rA<rB<rC", the area division numbers in the origin detection area h of the tracks TA to TC are set in a manner satisfying "nA<nB<nC". Three periodic signals corresponding to the area division numbers nA to nC are obtained from the tracks TA to TC. Therefore, the area division number nC in the origin detection area hC of the track TC is preferably set to a number corresponding to resolution required for detecting the position x with desired accuracy. Furthermore, the area division numbers nA and nB in the origin detection areas hA and hB of the tracks TA and TB are preferably set to numbers corresponding to resolution required for detecting the origin z with desired accuracy.

In the present embodiment, pitches pLA to pLC serving as intervals of the slits SLA to SLC in the tracks TA to TC are set to nearly the same pitch pL in the tracks TA to TC (pL=pLA=pLB=pLC). Two or more pitches among pLA to pLC of the tracks TA to TC only need to be nearly the same, and a track having a different pitch may be included. By setting the pitches pLA to pLC of the tracks TA to TC nearly equal to one another in this manner, the diffraction interference optical systems of the tracks TA to TC can be formed in the same manner. As a result, it is possible to facilitate designing, development, and manufacturing (also referred to as manufacturing and the like). In particular, by setting the pitches pLA to pLC of all the tracks TA to TC nearly the same in the present embodiment, it is possible to significantly facilitate manufacturing and the like. In the present embodiment, the "pitches pLA to pLC" means an arrangement interval between adjacent slits in the slits SLA to SLC, respectively. In other words, the pitches pLA to pLC mean center-to-center distances of the slits.

(Shape of Slit S)

The shapes of the slits SLA to SLC in the tracks TA to TC will now be described.

In the track TC arranged on the outermost periphery, the slit SLC is formed on a radial line (a radial line LINE 1 illustrated in FIG. 7) set at an equiangular interval about the disk center O (rotation axis AX). The slit in this shape is also referred to as a "radial slit".

By contrast, in the encoder 100 according to the present embodiment, the slits SLA and SLB of the tracks TA and TB are formed as a "curved slit" different from the radial slit so as to adjust the pitches pLA to pLC of the tracks TA to TC to the pitch pL as described above and to facilitate downsizing and manufacturing and the like more significantly. The slit SLC of the track TC may also be formed as the curved slit. In other words, at least one of the tracks TA to TC may be formed as the curved slit. If the curved slit is included in this manner, it is possible to facilitate adjustment of the pitches pLA to pLC, downsizing, and manufacturing and the like as described above. The curved slit will be described later in detail.

The pitches pLA to pLC of the radical slit and the curved slit in the present embodiment mean intervals (pitches) between slits at the centers of the widths wA to wC of the track T.

In the present embodiment, the area division numbers nA to nC in the origin detection area h of the tracks TA to TC are set in a manner satisfying nA<nB<nC as described above. The periodic numbers of signals in the origin detection area h obtained from the tracks TA to TC correspond to the area division numbers nA to nC in the origin detection area h, respectively.

The tracks TA and TB constitute a part of an example of an origin detection mechanism that detects the origin z. The track TC constitutes a part of an example of a position detection mechanism that detects the position x.

A TA track detection mechanism having the least signal periodic number obtained in the origin detection area h among the tracks TA to TC is also referred to as an "origin L (low) detection mechanism".

A detection mechanism with the track TB can detect a larger signal periodic number in the origin detection area h than the origin L detection mechanism. The detection mechanism with the track TB is also referred to as an "origin H (high) detection mechanism".

A detection mechanism with the track TC can detect a still larger signal periodic number in the origin detection area h than the origin H detection mechanism. The detection mechanism with the track TC is also referred to as an "incremental detection mechanism".

The incremental encoder 100 according to the present embodiment detects the position x by processing output from the incremental detection mechanism. Furthermore, the incremental encoder 100 detects the origin z by processing output from the origin L, the origin H, and the incremental detection mechanism.

The origin L detection mechanism, the origin H detection mechanism, and the incremental detection mechanism are different from one another in the area division numbers nA to nC in the origin detection area h and the shapes of the slits. However, the origin L detection mechanism, the origin H detection mechanism, and the incremental detection mechanism have something in common in that each mechanism has an independent diffraction interference optical system and that each mechanism uses the diffraction interference optical system as an optical detection principle, for example. Therefore, in the description below, the origin L detection mechanism, the origin H detection mechanism, and the incremental detection mechanism are also collectively referred to as an "optical detection mechanism".

(1-2-2. Detecting Units 130A to 130C)

Figure 4:
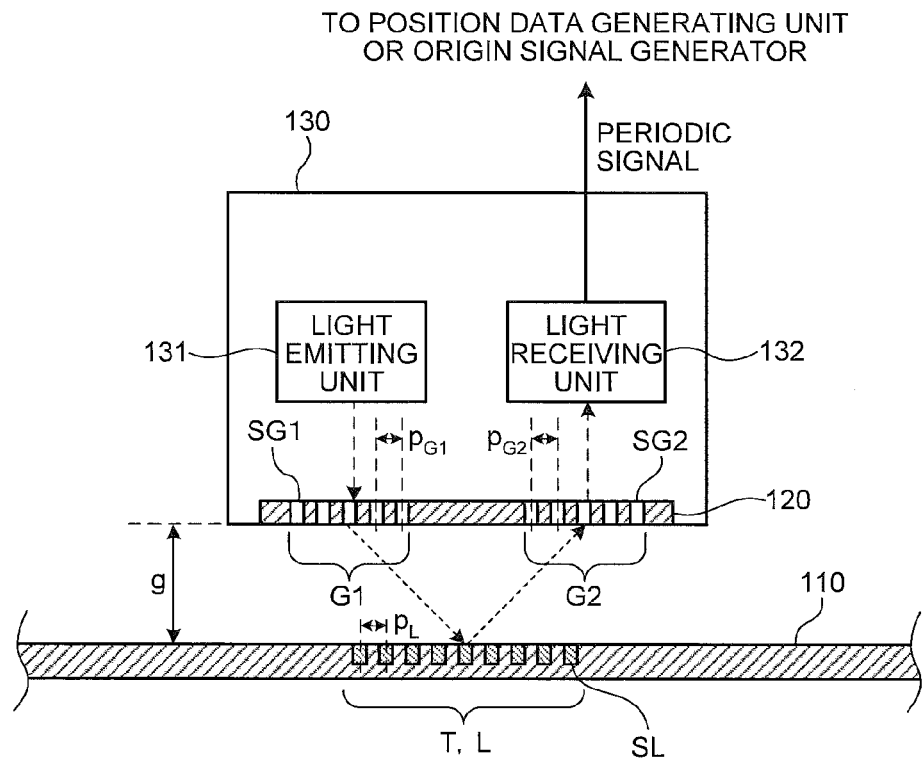
FIG. 4 is a view for explaining an optical detection mechanism provided to the rotary encoder according to the embodiment.
Figure 5:
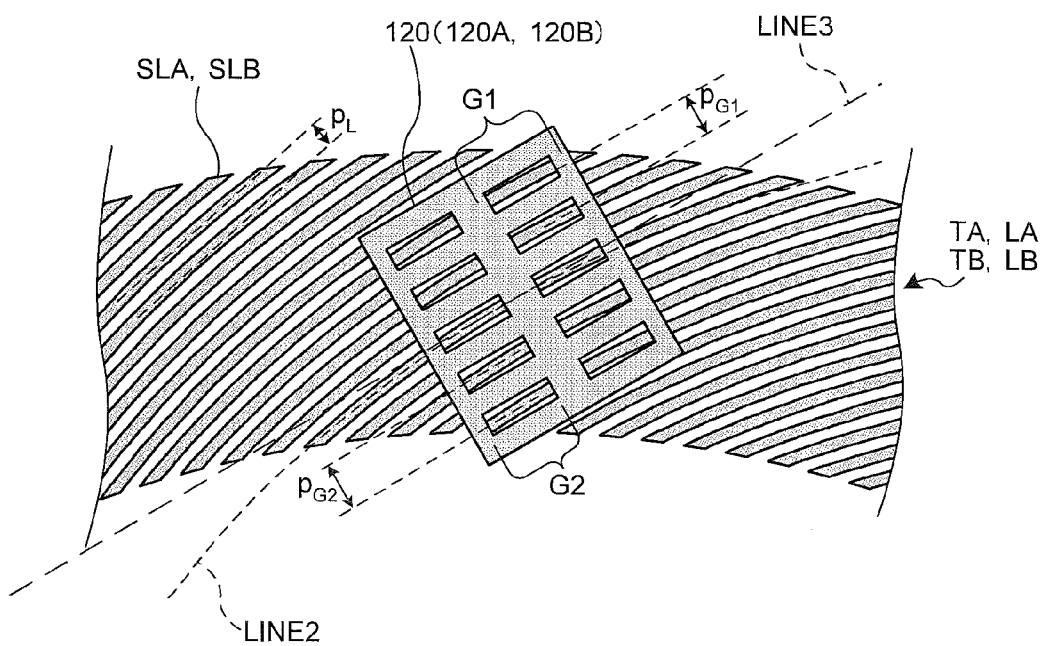
FIG. 5 is a view for explaining the optical detection mechanism provided to the rotary encoder according to the embodiment.
Figure 6:
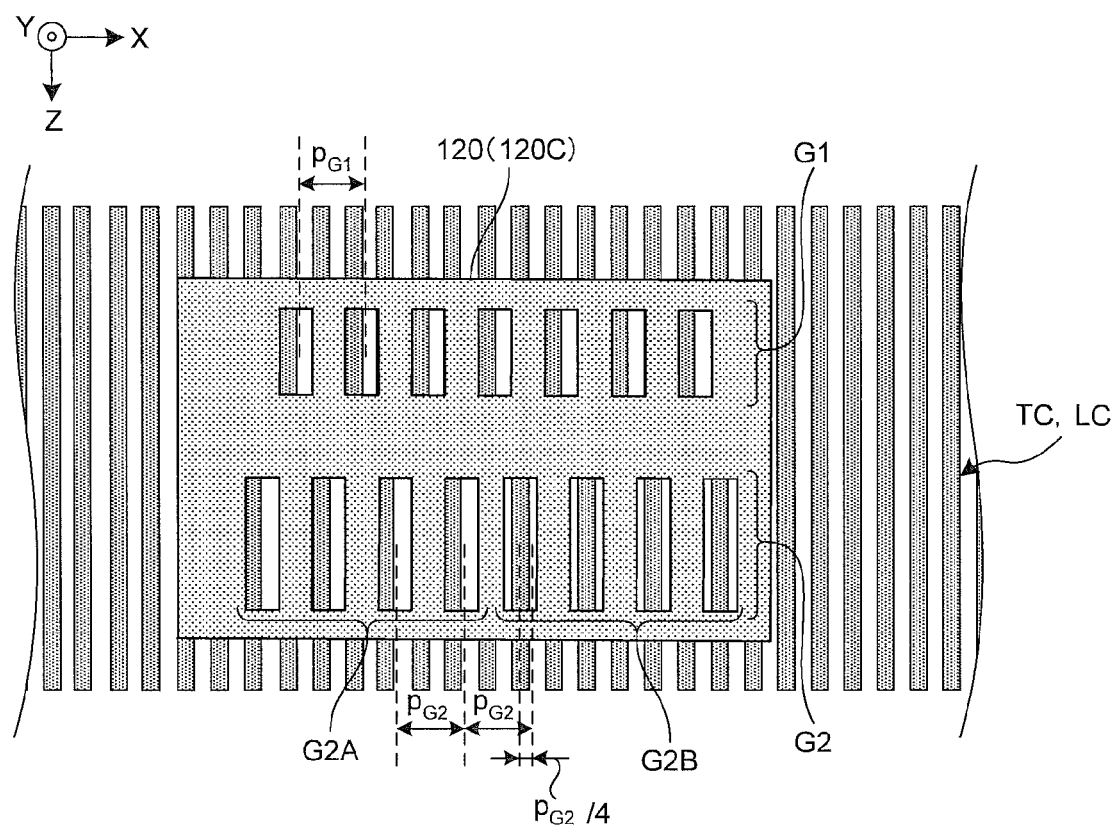
FIG. 6 is a view for explaining the optical detection mechanism provided to the rotary encoder according to the embodiment.

These detection mechanisms will now be described more specifically while explaining detecting units 130A to 130C with reference to FIG. 2 to FIG. 6. FIG. 4 to FIG. 6 are views for explaining the optical detection mechanism provided to the rotary encoder according to the present embodiment.

(Optical Detection Mechanism)

A detecting unit 130A is arranged in a manner facing the track TA and constitutes the origin L detection mechanism together with the track TA. A detecting unit 130B is arranged in a manner facing the track TB and constitutes the origin H detection mechanism together with the track TB. A detecting unit 130C is arranged in a manner facing the track TC and constitutes the incremental detection mechanism together with the track TC. Furthermore, as described above, the track TB and the track TA have the slits only in the origin detection area h. Therefore, the detecting unit 130A to the detecting unit 130C are arranged at positions facing the origin detection area h simultaneously in one rotation of the disk 110. In the case of FIG. 3A, because the origin detection areas hA to hC are arranged in a line, the detecting units 130A to 130C corresponding thereto are arranged in a corresponding line.

As described above, the optical detection mechanisms formed of the detecting units 130A to 130C have something in common in that each mechanism has an independent diffraction interference optical system, for example. For this reason, one optical detection mechanism will be described as an example with reference to FIG. 4, and differences in the optical detection mechanisms will be additionally described individually.

In association with this, to explain one optical detection mechanism as an example, a detecting unit (the detecting units 130A to 130C), a track (the tracks TA to TC), and a rotating grating (the rotating gratings LA to LC) corresponding to the optical detection mechanism are also simply referred to as a "detecting unit 130", a "track T", and a "rotating grating L", respectively, and a slit (the slits SLA to SLC) included in the rotating grating L is also simply referred to as a "slit SL" as illustrated in FIG. 4. Furthermore, a pitch (the pitches pLA to pLC) of the slit SL is also simply referred to as a "pitch pL", and the area division number (the area division numbers nA to nC) on the measuring circle X in the origin detection area h is also simply referred to as an "area division number n".

As illustrated in FIG. 4, the detecting unit 130 includes the mask 120, a light emitting unit 131, and a light receiving unit 132.

The mask 120 is fixed and arranged in a manner facing the disk 110 with the gap g interposed therebetween. The mask 120 is formed with a material that blocks light and includes two optical fixed gratings G1 and G2 (fixed diffraction gratings) having a plurality of slits SG1 and SG2, respectively, that transmit light. In other words, the mask 120 transmits light through the slits SG1 and SG2 of the fixed gratings G1 and G2, and the fixed gratings G1 and G2 constitute a three-grating diffraction interference optical system together with the rotating grating L.

In the present embodiment, the fixed grating G1 and the fixed grating G2 are formed on the single mask 120. Alternatively, the fixed grating G1 and the fixed grating G2 may be formed on different masks 120. If the fixed grating G1 and the fixed grating G2 are formed on different masks 120, the fixed grating G1 and the fixed grating G2 are preferably arranged such that a distance (gap g) between the fixed grating G1 and the rotating grating L is equal to a distance (gap g) between the rotating grating L and the fixed grating G2 on the same surface side of the disk 110. By using the two fixed gratings G1 and G2 whose distances from the rotating grating L are equal to each other and using a reflecting slit for the slit SL of the rotating grating L, even if the positional relationship between the disk 110 and the detecting unit 130 fluctuates, each gap g of both the fixed gratings G1 and G2 is made uniform. As a result, it is possible to reduce influence on the diffraction interference optical system caused by fluctuation in the gap g.

The relationship among the gaps g of the detecting units 130A to 130C in the optical detection mechanisms will now be described.

In the present embodiment, because the pitches pLA to pLC of the slits SLA to SLC of the tracks TA to TC are set nearly equal to one another to the pitch PL, the gaps g between the detecting units 130A to 130C and the tracks TA to TC, that is, the disk 110 can be set nearly equal to one another. In other words, in the present embodiment, the gap g between the rotating grating LA and the fixed gratings G1 and G2 corresponding thereto, the gap g between the rotating grating LB and the fixed gratings G1 and G2 corresponding thereto, and the gap g between the rotating grating LC and the fixed gratings G1 and G2 corresponding thereto can be set nearly equal to one another as illustrated in FIG. 2.

If the gaps g are set in this manner, diffraction interference optical systems corresponding to the gaps g can be designed and developed for the detecting units 130A to 130C in common, and adjustment of the gaps g in manufacturing can be performed simultaneously on the detecting units 130A to 130C. Thus, it is possible to facilitate manufacturing and the like. Because the gaps g of the detecting units 130A to 130C are set equal to one another in this manner, the masks 120 of the detecting units 130A to 130C illustrated in FIG. 4 can be formed integrally, or the detecting units 130A to 130C can be formed integrally. Thus, it is possible to further facilitate manufacturing and the like.

It goes without saying that such advantageous effects can be provided in the same manner simply by making the gaps g uniform between any two of the rotating gratings LA to LC (an example of one track and another track) and the fixed gratings G1 and G2 corresponding thereto. However, the optical detection mechanism in which the gaps g are made uniform is preferably an optical detection mechanism in which the pitches pL of the tracks T are set equal to one another.

The fixed gratings G1 and G2 will now be described while explaining the light emitting unit 131 and the light receiving unit 132.

The light emitting unit 131 includes a light source and irradiates the fixed grating G1 of the mask 120 with light. While the wavelength and the intensity of the light output from the light emitting unit 131 is not particularly restricted, the wavelength and the intensity may be determined as appropriate in accordance with characteristics of the diffraction interference optical system, required position resolution, and the like. In the present embodiment, diffusion light is used as the irradiation light. By using diffusion light, the slits SG1 of the fixed grating G1, which will be described later, can be considered as an approximately linear light source, thereby enhancing a diffraction interference effect. If the slit SG1 can be considered as an approximately linear light source in this manner, parallel light, laser light, convergent light, and the like can be used as the irradiation light. It goes without saying that the light emitting unit 131 may include a predetermined optical element, such as a diffusing lens, in accordance with characteristics of light to be used, such as parallel light, laser light, convergent light, and diffusion light.

The fixed grating G1 is formed at a position on which the light output from the light emitting element 131 is incident. The fixed grating G1 includes the transmitting slits SG1 and diffracts the incident light by the slits SG1. As a result, each of the slits SG1 can convert the light output to the disk 110 into light output from each of the slits SG1 serving as an approximately linear light source.

A pitch pG1 between the slits SG1 of the fixed grating G1 is formed so as to satisfy a relationship of "pG1=i×pL (i=1, 2, 3 . . .)" with respect to the pitch pL between the slits SL of the rotating grating L. In particular, in the case of "i=1, 2", the intensity of a periodic signal to be obtained is likely to increase. Furthermore, in the case of "i=2", the intensity of the periodic signal is more likely to increase than the case of "i=1". A signal periodic number m obtained in the origin detection area h changes depending on the value i besides the area division number n. Specifically, the signal periodic number m satisfies "m=2×n/i" in at least the case of "i=1, 2". An explanation will be made of the case where "i=2" is satisfied, that is, where "pG1=2pL" and "m=n" are satisfied for convenience of description.

The light transmitted through the fixed grating G1 spreads out in the width direction of the fixed grating G1 depending on an incidence angle of the light being incident on the fixed grating G1. Therefore, the width of the slit SL of the rotating grating L is preferably set larger than the width of the slit SG1 of the fixed grating G1 so as to improve the signal intensity in consideration of the spread angle. In this case, by setting the width of the slit SL of the rotating grating L still larger or smaller than a width in which the light transmitted through the fixed grating G1 is expected to reach, it is possible to further improve the stability of a signal against an installation error between the fixed grating G1 and the rotating grating L.

Similarly, the light reflected by the rotating grating L spreads out in the width direction of the rotating grating L depending on an incidence angle of the light being incident on the rotating grating L. Therefore, the width of the slit SG2 of the fixed grating G2, which will be described later, is preferably set larger than the width of the slit SL of the rotating grating L so as to improve the signal intensity in consideration of the spread angle. In this case, by setting the width of the slit SG2 of the fixed grating G2 still larger or smaller than a width in which the light reflected by the rotating grating L is expected to reach, it is possible to further improve the stability of a signal against an installation error between the fixed grating G2 and the rotating grating L in the same manner.

It goes without saying that the relationship among the widths of the slits of the fixed grating G1, the fixed grating G2, and the rotating grating L are not restricted in particular if sufficient signal intensity is ensured and the stability of a signal against an installation error is sufficiently ensured.

The slits SG1 included in the fixed grating G1 are preferably formed in a manner nearly parallel to the slits SL formed at a facing position so as to enhance the diffraction interference effect of the diffraction interference optical system formed together with the rotating grating L and the fixed grating G2 and to reduce noise.

In other words, as illustrated in FIG. 3A, because the slits SLA and SLB of the rotating gratings LA and LB are curved slits, the slits SG1 of the rotating grating G1 of the detecting units 130A and 130B are preferably formed as curved slits in a manner parallel to facing curved slits. By contrast, because the slits SLC of the rotating grating LC are radial slits, the slits SG1 of the rotating grating G1 of the detecting unit 130C are preferably formed as radial slits in a manner parallel to facing radial slits.

In terms of radial slits, as disclosed in U.S. Pat. No. 5,559, 600, the pitch pL of the radial slits is short enough compared with the whole circumference of the track T to consider the radial slits as optically parallel slits. Therefore, the slits SG1 of the fixed grating G1 of the detecting unit 130C corresponding to the radial slits can be formed as "parallel slits" parallel to one another. Similarly, the slits SG1 of the fixed grating G1 of the detecting units 130A and 130B corresponding to the curved slits can be formed as parallel slits as illustrated in FIG. 5. In this case, the parallel slits of the fixed grating G1 corresponding to the radial slits are preferably arranged in a manner parallel to the parallel slits obtained by considering the radial slits as the parallel slits. Furthermore, the parallel slits of the fixed grating G1 corresponding to the curved slits are preferably arranged in a manner nearly parallel to a tangent LINE 3 to each curved slit at one or more points as illustrated in FIG. 5. By forming both the fixed gratings G1 corresponding to the radial slits and the curved slits as parallel slits in this manner, an identical fixed grating G1 can be used for both the fixed gratings G1. As a result, it is possible to further facilitate manufacturing and the like and to reduce manufacturing cost.

As illustrated in FIG. 4, the light diffracted by the fixed grating G1 is output to the rotating grating L corresponding to the fixed grating G1. The light output to the rotating grating L is then reflected by the slit SL of the rotating grating L. At this time, the light thus reflected is further diffracted by the rotating grating L. Subsequently, the light diffracted by the rotating grating L is output to the fixed grating G2.

The fixed grating G2 of the mask 120 used for the origin L detection mechanism and the origin H detection mechanism is formed at a position on which the light diffracted by the rotating grating L is incident. A pitch pG2 between the slits SG2 of the fixed grating G2 is set to equal to the pitch pG1 between the slits SG1 of the fixed grating G1. In other words, in the present embodiment, "pG1=pG2=2×pL" is satisfied. Furthermore, the shape of the slit SG2, the positional relationship with respect to the slit SG1 of the fixed grating G1, and other elements are the same as those of the slit SG1 of the fixed grating G1 described above. For this reason, detailed explanations thereof will be omitted.

By contrast, as illustrated in FIG. 4, the light diffracted by the rotating grating L is output to the fixed grating G2. The light output to the fixed grating G2 forms interference fringes in which the light diffracted by each of the slits SL of the rotating grating L interferes. The position of bright bands in the interference fringes moves in response to a change in the positional relationship between the fixed grating G1 and the rotating grating L caused by rotation of the disk 100. As a result, the intensity of light passing through the slit SG2 increases sinusoidally.

The light receiving unit 132 is arranged so as to receive the light transmitted through the slit SG2 of the fixed grating G2. The light receiving unit 132 includes a light receiving element, such as a photodiode, and converts the intensity of the light thus received into an electrical signal.

The electrical signal generated by the light receiving unit 132 is an approximately sinusoidal electrical signal (also referred to as a "periodic signal") at a predetermined period repeated every time the disk 110 moves by an amount corresponding to the pitch pL and the like.

Periodic signals obtained in the origin L detection mechanism and the origin H detection mechanism are also collectively referred to as an "origin L signal" and an "origin H signal", respectively.

As illustrated in FIG. 6, because the mask 120 (a mask 120C) used for the incremental detection mechanism has a different structure from those of the mask 120 (masks 120A and 120B) used for the origin L detection mechanism and the origin H detection mechanism, the explanation thereof will be made. Unlike the fixed grating G2 of the masks 120A and 120B, the fixed grating G2 of the mask 120C is divided into two or more areas (e.g., areas G2A and G2B illustrated in FIG. 6). The slits SG2 of each area are formed with the uniform pitch pG2 therebetween in the areas. However, the pitch between the areas is formed by adding "pG2/4" to the pitch pG2.

As a result, the intensity of light passing through the slits SG2 of the areas G2A and G2B shifted by "pG2/4" from each other increases sinusoidally in a manner shifting by 90 degrees.

In this case, the light receiving unit 132 includes two light receiving surfaces, for example, such that the light receiving unit 132 can generate different electrical signals for the areas G2A and G2B.

Similarly to the intensity of the light passing through the slits SG2 of the areas G2A and G2B, the periodic signals each corresponding to the areas G2A and G2B are two periodic signals out of phase with each other by 90 degrees.

The two periodic signals are also referred to as an "A-phase periodic signal" and a "B-phase periodic signal". The two periodic signals obtained in the incremental detection mechanism are also collectively referred to as an "incremental signal". In other words, each of the origin L signal and the origin H signal are one periodic signal, and the incremental signal is two periodic signals.

As described above, the optical detection mechanism is formed of a three-grating diffraction interference optical system. Therefore, if interference occurs in the relationship among the pitches pL, pG1, pG2, and the like regardless of the size of the gap g, it is possible to detect a desired periodic signal.

A geometrical optical encoder simply receives light transmitted through the slit SL. Therefore, as the gap g is made larger, noise increases because of influences of light in a diffraction component and a diffusion component. To address this, the gap g needs to be made smaller. By contrast, in the diffraction interference optical system disclosed in the present embodiment, the gap between a fixed member and a rotating member can be made larger. As a result, it is possible to increase flexibility in designing and development and to reduce trouble in that the fixed member and the rotating member interfere with each other because of an impact and the like.

As described above, while a three-grating (the rotating grating L and the fixed gratings G1 and G2) diffraction interference optical system is explained as an example in the present embodiment, the present invention is not limited thereto. By using light receiving elements in a band shape having a light receiving surface at a position corresponding to each of the slits SG2 of the fixed grating G2 instead of the fixed grating G2, for example, a pseudo three-grating diffraction interference optical system can be formed. Furthermore, by using light emitting elements in a band or linear shape that emit light at a position corresponding to each of the slits SG1 of the fixed grating G1 instead of the fixed grating G1, for example, a pseudo three-grating diffraction interference optical system can also be formed. It goes without saying that the number of gratings is not restricted in particular as long as it is possible to form a similar three-grating diffraction interference optical system.

(1-2-3. Structure of Curved Slit)

Figure 7:
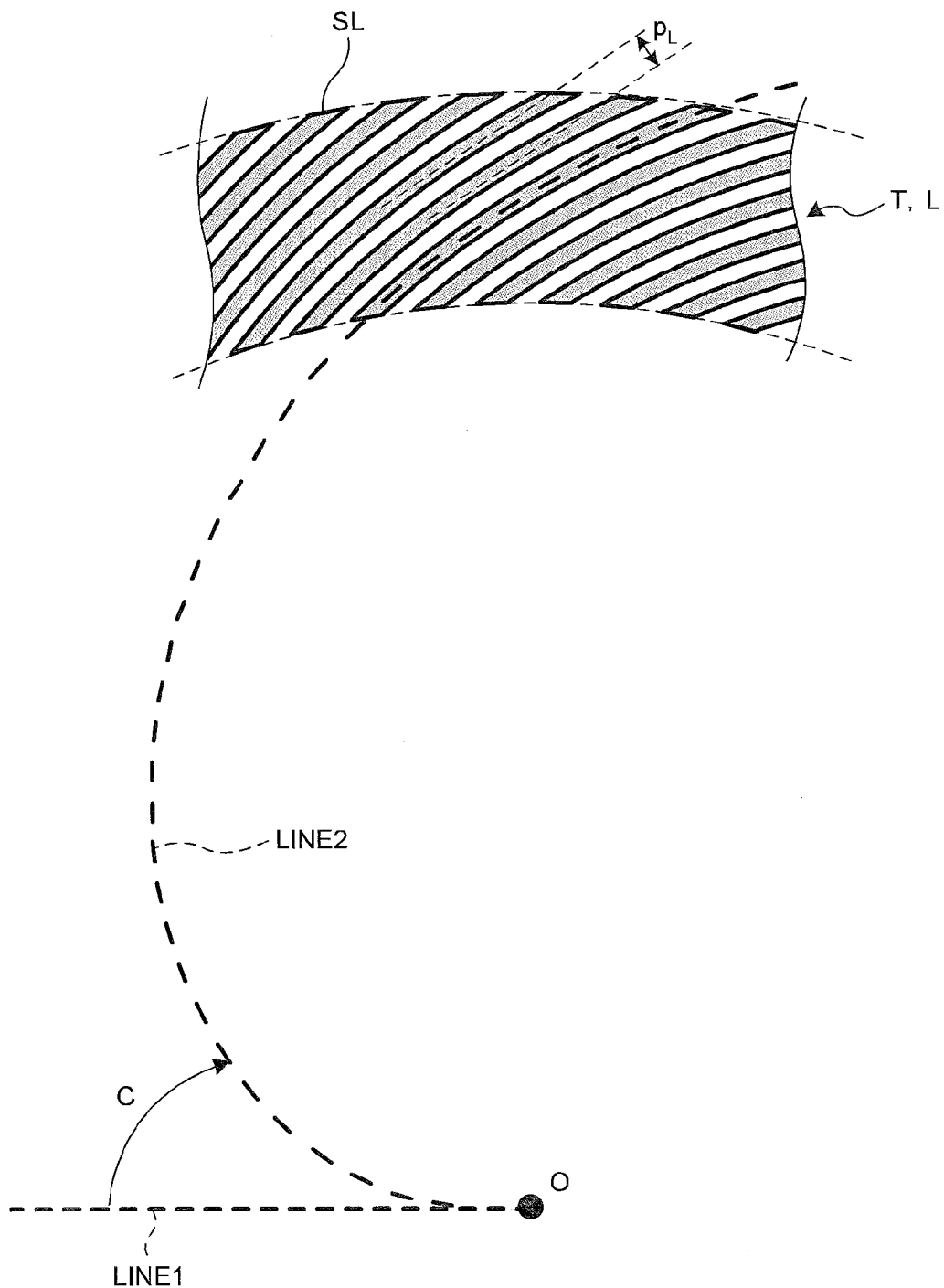
FIG. 7 is a view for explaining a curved slit provided to the rotary encoder according to the embodiment.

The explanation has been made of the configuration of the rotary encoder 100 according to the first embodiment of the present invention. The curved slits used for the rotating gratings LA and LB will now be described in detail with reference to FIG. 5 and FIG. 7. FIG. 7 is a view for explaining the curved slit provided to the rotary encoder according to the present embodiment.

(Curved Slit in One Track T)

One of the curved slits, that is, the slit SLA of the rotating grating LA on the track TA or the slit SLB of the rotating grating LB on the track TB will now be described as an example with reference to FIG. 7. Differences between the slit SLA and the slit SLB will be described individually.

While the slit SL of the rotating grating L according to the present embodiment is arranged on the track T, the slit SL of one or more rotating gratings L is formed as a curved slit different from a radial slit as described above and illustrated in FIG. 7.

As illustrated in FIG. 7, the slit SL formed as a curved slit (simply referred to as the "slit SL") is formed along a curved line LINE 2 obtained by curving a radial line LINE 1 about the disk center O (rotation axis AX) in the circumferential direction at predetermined curvature C.

While various examples of formation of the slit SL along the curved line LINE 2 are conceivable, an example of formation of the slit SL will be explained as follows.

The radial line LINE 1 corresponding to each slit SL is set for the number of slits corresponding to the area division number n to be set in the origin detection area h of the track T and at every angle obtained by equiangularly dividing the origin detection area reference angle H. Subsequently, each radial line LINE 1 is curved at the same curvature C in the same circumferential direction to be positioned at the origin detection area h, whereby the curved line LINE 2 for each of the slits SL is set. Each of the slits SL is then formed with a predetermined width along the curved line LINE 2 thus set.

The example of formation of the slit SL will be explained more specifically using Equation.

The disk center O is determined to be the origin, l represents a distance from the origin, θ represents an angle with respect to a reference line passing through the origin, rIN and rOUT represent an inner diameter and an outer diameter, respectively, of the track T in which the origin detection area h is set, and H° represents an origin detection area reference angle in the origin detection area h. Furthermore, n represents the number of slits along the measuring circle X included in the rotating grating L in the origin detection area h, that is, the area division number, and an assumption is made that each slit is identified by j (j=0, 1, 2 . . . , n−1). The radial line LINE 1 is expressed in polar coordinates by Equation 1.

$$\text{LINE } 1 = (l, j \times H/n) \quad (1)$$

where $rIN \leqq l \leqq rOUT$ is satisfied.

If C represents the curvature, and r0 represents a radius at which the pitch of the slits SL of the rotating grating L is a desired pL (a radius in the center of the width direction of the origin detection area h), the curved line LINE 2 is expressed in polar coordinates by Equation 2. The slit SL is formed within a predetermined width w (=rOUT−rIN) of the origin detection area h along the curved line LINE 2.

$$\text{LINE } 2 = (r0(1-C\theta), \theta + j \times H/n) \quad (2)$$

where $rIN \leqq r0(1-C\theta) \leqq rOUT$ is satisfied.

Note that r0 represents a radius at which the pitch of the slits SL of the rotating grating L is a desired pL.

In the example of formation of the curved slit, the curvature C is expressed by Equation 3.

$$C = \tan[\sin^{-1}\{pL \times n/(2\pi r0)\}] \quad (3)$$

The track T (that is, the origin detection area h) is preferably formed with a width w (=rOUT−rIN) large enough to allow the light reflected by the rotating grating L, transmitted through the fixed grating G2, and received by the light receiving element to have a sufficient light amount. In the diffraction interference optical system according to the present embodiment, for example, setting the width w of the track T to approximately 20 times to 50 times as large as the pitch pL of the rotating grating L makes it possible to obtain a sufficient light amount. Therefore, as is clear from Equation 3, the slit SL serving as the curved slit reaches from a position on the track inner diameter (rIN) to a position on the track outer diameter (rOUT) at the angle θ within 180°. Each one of the curved slits SL is formed at the angle θ within 180° so as not to make a circuit of the track T. Forming the curved slit in this manner makes it possible to increase the strength of the disk 110 and to facilitate the formation of the slit SL.

Typically in the diffraction interference optical system formed of the rotating grating L according to the present embodiment, as the pitch of the slits SL included in the rotating grating L is formed more uniform regardless of the position of the slits SL in the longitudinal direction, noise in the sinusoidal periodic signal thus obtained can be reduced, and the position detection accuracy can be improved. In other words, as the increasing rate and the decreasing rate of a shift amount from the pitch pL with respect to movement from the center of the width w of the track T to the track inner diameter or the track outer diameter along the slit SL are reduced, noise can be suppressed, and the detection accuracy can be improved.

By contrast, with the curved slit according to the present embodiment, the slit SL is formed in a curved manner, whereby it is possible to reduce a change amount of the pitch (also referred to as a "change rate of the pitch") of the slit SL in the direction of formation of the slit SL (the direction of the curved line LINE 2). As a result, the encoder 100 according to the present embodiment can improve the detection accuracy for the periodic signal obtained from each optical detection mechanism and improve the origin detection accuracy.

More specifically, for example, if the slit SL is a radial slit, the slit SL is formed on the radial line LINE 1. Because the length in the direction of formation of the slit SL (radial line LINE 1) is nearly equal to the width w of the track T, the change rate of the pitch of the slit SL in the direction of formation is relatively high. The relatively high change rate of the pitch causes reduction in the detection accuracy for the periodic signal. The reduction in the detection accuracy is made larger as the area division number n is smaller. By contrast, if the slit SL is a curved slit, the length in the direction of formation of the slit SL (curved line LINE 2) can be extended by the length corresponding to the curvature C compared with the radial slit. As a result, it is possible to make the change rate of the pitch of the slit SL relatively low, thereby improving the detection accuracy for the periodic signal.

Therefore, with such a curved slit, the encoder 100 according to the present embodiment can set the tracks TA to TC from which different signal periodic numbers m are obtained without reducing the flexibility in designing, development, and the like or reducing the detection accuracy for the periodic signal. Consequently, according to the present embodiment, it is possible to facilitate formation of the highly accurate and small encoder 100.

Typically in a diffraction interference optical system, the optimum gap g between the rotating grating L and the fixed gratings G1 and G2 depends on a wavelength λ, of the light output from the light emitting element 131 and on the pitch pL of the slits SL of the rotating grating L. In a three-grating optical system, if k represents a positive integer, for example, the gap g becomes the optimum when Equation 4 is satisfied in the case of pG1=pL=pG2. The gap g becomes the optimum when Equation 5 is satisfied in the case of pG1=2×pL=pG2.

$$g = (2 \times k - 1) \times pL2/4\lambda \quad (4)$$

$$g = (2 \times k) \times pL2/\lambda \quad (5)$$

By contrast, with the curved slit according to the present embodiment, the pitch pL of the slits SL is expressed by Equation 6 using a function if with the slit number n, the track radius r(=r0), and the curvature C.

$$\begin{aligned} pL &= f(n, r, C) \\ &= (2\pi r/n) \times \sin(\tan - 1C) \end{aligned} \quad (6)$$

Therefore, simply by setting the curvature C as appropriate, it is possible to set the pitch pL to the optimum value at which a diffraction interference optical system is formed without changing the area division number n (corresponding to the period of the periodic signal) or the track radius r. As a result, the area division number n, the track radius r, and other elements can be set optionally, whereby it is possible to facilitate downsizing, designing, development, and the like.

If the slit SL is formed in a manner circling one or more times in the track T unlike the present embodiment, such a slit is also referred to as a "multiple spiral slit". In such a multiple spiral slit, the number of slits SL layered in the radial direction increases and the width w of the track T increases, thereby making it difficult to achieve downsizing. Thus, the flexibility in designing and development is reduced, resulting in difficulties in manufacturing. By contrast, the slit SL according to the present embodiment is not a multiple spiral slit but a curved slit. As a result, as described above, it is possible to increase the flexibility in designing and development and to facilitate manufacturing and downsizing.

The example of formation of the curved slit, Equations of the curved line LINE 2, and the like described above are given just as an example, and Equations described above need not be actually calculated. In other words, as long as the slit SL along the curved line LINE 2 curved in the circumferential direction is formed as described above, the formation method, the design method, and other methods are not restricted in particular.

(Positional Relationship Between Curved Slit and Slit on Fixed Grating Side)

If a parallel slit is used for the fixed gratings G1 and G2, the fixed gratings G1 and G2 are arranged such that each of the slits SG1 and SG2 is parallel to the tangent LINE 3 to the curved line LINE 2 of the slit SL of the rotating grating L corresponding thereto as illustrated in FIG. 5. With the curved slit according to the present embodiment, even if the arrangement position of the fixed gratings G1 and G2 shifts slightly, the area in which the fixed gratings G1 and G2 serving as parallel slits are parallel to the rotating grating L can be considerably secured because the change amount of the pitch pL of the curved slit is relatively small. As a result, it is possible to further improve the detection accuracy for the periodic signal and to facilitate manufacturing and the like significantly.

(Curved Slit in Relationship Among a Plurality of Tracks)

The explanation has been made of the curved slit in one track T. The curved slit in the relationship between the tracks TA and TB will now be described with reference to FIG. 2 and FIG. 3A.

In the present embodiment, as illustrated in FIG. 2, the gaps g between the rotating gratings LA to LC of all the tracks TA to TC and the masks 120 of the detecting units 130A to 130C corresponding to the rotating gratings LA to LC, respectively, are set nearly equal to one another. To form a diffraction interference optical system, it is important to realize the pitch pL of the slit SL corresponding to the gap g such that Equation 4 or Equation 5 is satisfied.

In the present embodiment, as illustrated in FIG. 3A, the curvature C in the slit SLA of the track TA is set such that the pitch pLA of the slit SLA is equal to the pitch pLC of the slit SLC of the track TC serving as a track other than the track TA. Furthermore, as illustrated in FIG. 3A, the curvature C in the slit SLB of the track TB is set such that the pitch pLB of the slit SLB is equal to the pitch pLC of the slit SLC of the track TC serving as a track other than the track TB.

The area division number nA in the origin detection area hA of the track TA is different from the area division number nB in the origin detection area hB of the track TB. Therefore, as is clear from Equation 3, the curvature C in the track TA is set different from the curvature C in the track TB. Thus, the pitch pLA in the track TA and the pitch pLB in the track TB, which are curved slits, can be set nearly equal to each other.

As a result, it is possible to make the pitches pLA to pLC of the slits SLA to SLC in all the tracks TA to TC nearly uniform. Therefore, the detecting units 130A to 130C can be arranged with the uniform gap g while forming the diffraction interference optical system. If the detecting units 130A to 130C can be formed with the uniform gap g in this manner, it is possible to facilitate adjustment of the detecting units 130A to 130C in the gap g direction and to form the detecting units 130A to 130C integrally. If the detecting units 130A to 130C are formed integrally, the masks 120 provided to each of the detecting units may be formed integrally as a single mask. In this case, it is possible to increase the flexibility in designing and the like and to facilitate manufacturing.

(1-2-4. Position Data Generating Unit 140)

The position data generating unit 140 included in the encoder 100 will now be described with reference to FIG. 2. The position data generating unit 140 acquires a sinusoidal incremental signal from the detecting unit 130C. The position data generating unit 140 then specifies the position x of the motor 200 from the signal and outputs position data indicating the position x. An example of the specification processing of the position x performed by the position data generating unit 140 will now be described more specifically.

As described above, in the present embodiment, the incremental signal acquired by the position data generating unit 140 includes two periodic signals of the A-phase periodic signal and the B-phase periodic signal out of phase with each other by 90 degrees. In other words, the position data generating unit 140 acquires two sinusoidal signals of the A phase and the B phase as the incremental signal.

The position data generating unit 140 then performs multiplication processing and the like on the incremental signal, thereby converting the two sinusoidal signals of the A phase and the B phase into a signal monotonically increasing in a period (alternatively, it may be a signal monotonically decreasing. Hereinafter, it is also referred to as a "monotonically increasing signal").

Thus, the position data generating unit 140 specifies the position x of the motor 200 based on the incremental signal.

It goes without saying that the processing performed by the position data generating unit 140 may be performed by the controller 20. In this case, the position data generating unit 140 may output each sinusoidal periodic signal to the controller 20 as position data.

(1-2-5. Origin Signal Generator 141)

The origin signal generator 141 also included in the encoder 100 will now be described with reference to FIG. 2 and FIGS. 8A to 8D. FIG. 8A to 8D are views for explaining the origin signal generator provided to the rotary encoder according to the present embodiment.

The origin signal generator 141 acquires a sinusoidal origin L signal, a sinusoidal origin H signal, and a sinusoidal incremental signal from the detecting units 130A to 130C. The origin signal generator 141 then specifies the origin z of the motor 200 from these signals and outputs an origin signal indicating the origin z. An example of the specification processing of the origin z performed by the origin signal generator 141 will now be described more specifically.

As described above, in the present embodiment, the incremental signal acquired by the origin signal generator 141 includes two periodic signals of the A-phase periodic signal and the B-phase periodic signal out of phase with each other by 90 degrees. In other words, the origin signal generator 141 acquires two sinusoidal signals of the A phase and the B phase as the incremental signal.

The origin signal generator 141 then uses one of the two sinusoidal signals of the A phase and the B phase to perform processing. An assumption is made that the origin signal generator 141 uses the A phase, for example. In the description below, the A-phase signal of the incremental signal is also simply referred to as an "incremental A signal".

Figure 8A:
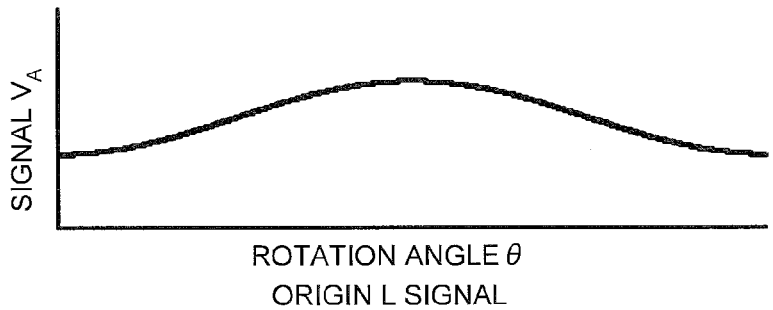
FIG. 8A is a view for explaining an origin signal generator provided to the rotary encoder according to the embodiment.
Figure 8B:
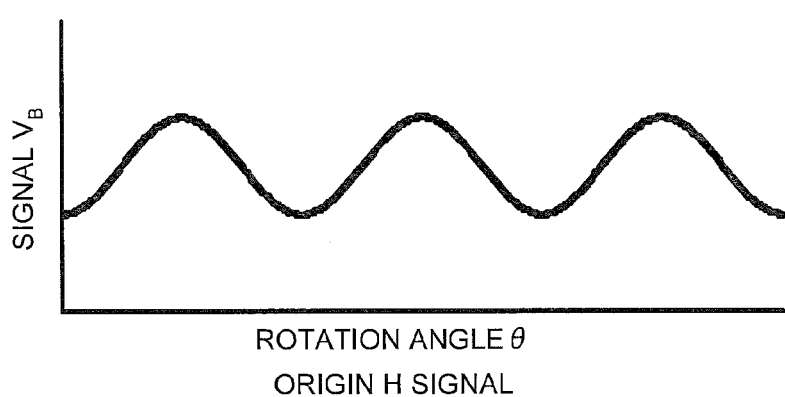
FIG. 8B is a view for explaining the origin signal generator provided to the rotary encoder according to the embodiment.
Figure 8C:
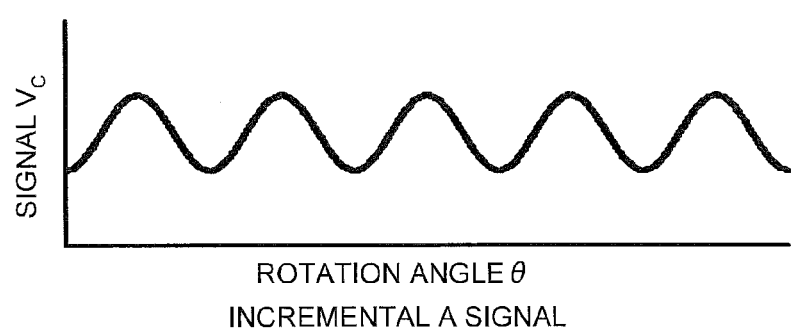
FIG. 8C is a view for explaining the origin signal generator provided to the rotary encoder according to the embodiment.
Figure 8D:
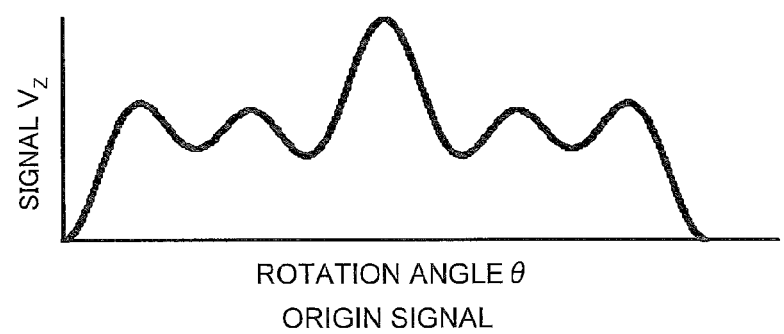
FIG. 8D is a view for explaining the origin signal generator provided to the rotary encoder according to the embodiment.

FIG. 8A illustrates an example of the origin L signal, FIG. 8B illustrates an example of the origin H signal, FIG. 8C illustrates an example of the incremental A signal, and FIG. 8D illustrates an example of the origin signal. In FIG. 8A to FIG. 8D, the horizontal axis represents mechanical angles (angle θ) and the vertical axis represents each signal V. Output signals of the origin L signal, the origin H signal, and the incremental signal are also referred to as "VA", "VB", and "VC", respectively.

FIG. 8A illustrates an example of the signal VA obtained when the rotating disk 110 rotates by a predetermined angle equal to or smaller than the origin detection area reference angle H, that is, when passing through the origin detection area h, as the origin L signal.

FIG. 8B illustrates an example of the signal VB obtained when the disk 110 rotates by a predetermined angle equal to or smaller than the origin detection area reference angle H, that is, when passing through the origin detection area h, as the origin H signal.

FIG. 8C illustrates an example of the signal VC obtained when the disk 110 rotates by a predetermined angle equal to or smaller than the origin detection area reference angle H, that is, when passing through the origin detection area h, as the incremental A signal.

FIG. 8D illustrates an example where the output signals VA, VB, and VC are added when the disk 110 rotates by the origin detection area reference angle H, that is, when passing through the origin detection area h, as the origin signal.

The area division numbers n of the origin L signal, the origin H signal, and the incremental signal are set to odd multiples of 1, 3, and 5, respectively, and each signal outputs a sine wave of the number of periods corresponding thereto.

If the pitch satisfies the relationship of "pG1=2×pL=pG2" as in the present embodiment, the area division numbers nA to nC in the origin detection area h repeated in the measuring circle X of the tracks TA to TC are set to 1, 3, and 5, respectively, to realize such a resolution. However, it is given just as an example and is not intended to limit the area division numbers nA to nC of the tracks TA to TC. The area division numbers nA to nC of the tracks TA to TC may be set as appropriate in accordance with a desired signal periodic number for the periodic signal obtained therefrom.

The origin signal generator 141 generates the origin L signal, the origin H signal, and the incremental A signal, and specifies the origin z of the motor 200 based on these signals.

More specifically, in the example illustrated in FIG. 8A to FIG. 8C, the slits SLA to SLC of the tracks TA to TC are arranged such that peaks of a plurality of periodic signals coincide with one another only at one point in one rotation of the disk 110, and the origin signal generator 141 adds three signals of the origin L signal, the origin H signal, and the incremental A signal. As illustrated in FIG. 8D, the signal thus added forms a peak at a position where the peaks of the periodic signals coincide with one another. Therefore, the origin signal generator 141 generates an origin signal $V_z$ from the peak formation position of the added signal. As for an example of a method for generating an origin signal, the origin signal generator 141 uses a comparison device, such as a comparator, to convert the added signal into a digital signal by a predetermined threshold capable of extracting only the peak of the added signal. Thus, the origin signal generator 141 generates a square wave indicating the origin position, that is, an origin pulse signal indicating the origin z as the origin signal V.

As a result, the origin signal generator 141 can specify the origin z of the motor 200 with resolution similar to the resolution of the outermost incremental detection mechanism. The origin signal generator 141 then outputs the origin signal indicating the origin z thus specified to the controller 20.

It goes without saying that the processing performed by the origin signal generator 141 may be performed by the controller 20. In this case, the origin signal generator 141 may output each sinusoidal periodic signal to the controller 20 as an origin signal.

1-3. Operation of Rotary Motor System According To First Embodiment

An operation of the motor system 1 according to the present embodiment will now be described. Because operations, functions, and the like in each component have been described in detail in the explanation of each component, the explanation thereof will be omitted as appropriate.

The controller 20 acquires a higher-level control signal from a higher-level control device or the like and acquires position data indicating the position x of the motor 200 and a origin signal indicating the origin z from the encoder 100. The controller 20 then generates a control signal based on the higher-level control signal, the position data, and the origin signal, and outputs the control signal to the motor 200.

As a result, the motor 200 rotates the rotating shaft 201 based on the control signal. Thus, the disk 110 of the encoder 100 connected to the rotating shaft 202 corresponding to the rotating shaft 201 via the rotating shaft 101 is rotated. The detecting units 130A to 130C each detect a signal in response to the rotation of the disk 110 and output the signal to the position data generating unit 140 and the origin signal generator 141. The position data generating unit 140 and the origin signal generator 141 generate position data and an origin signal based on these signals thus acquired, respectively, and output the position data and the origin signal to the controller 20.

As described above, the encoder 100 according to the present embodiment can detect the highly accurate position x and the origin z of the motor 200 and supply the position x and the origin z to the controller 20 as position data and an origin signal. Therefore, the motor system 1 can control the position x of the motor 200 with high accuracy based on the highly accurate position x and the origin z.

1-4. Method for Manufacturing Rotary Encoder According to First Embodiment

The explanation has been made of the rotary motor system according to the first embodiment of the present invention.

A method for manufacturing the encoder 100 according to the present embodiment will now be described with reference to FIG. 9. FIG. 9 is a flowchart for explaining a method for manufacturing the rotary encoder according to the present embodiment. In the description below, a method for producing a curved slit will be mainly explained.

As illustrated in FIG. 9, in the method for manufacturing the encoder 100, processing at Step S101 is performed. At Step S101 (an example of a slit number determination step), a desired signal periodic number to be acquired in the origin detection area h of one track T of the disk 110, which is a curved slit, is determined. In accordance with the period, the area division number n, that is, the number of slits along the measuring circle X formed in the origin detection area h is determined. Subsequently, the system control goes to Step S103.

At Step S103 (an example of a radial line setting step), the radial lines LINE 1 of the number determined at Step S101 are set equiangularly within the origin detection area reference angle H of the origin detection area h about the disk center O (rotation axis AX) as illustrated in FIG. 7. Subsequently, the system control goes to Step S105.

At Step S105 (an example of a curved line setting step), the curvature C is set such that the pitch pL of the silt SL is a desired value. The radial lines LINE 1 set at Step S103 are curved at the same curvature C thus set in the same circumferential direction, whereby a plurality of curved lines LINE 2 are set. At this time, the setting positions of the radial lines LINE 1 are determined at Step S103 such that the curved lines LINE 2 are included in the origin detection area h. To produce a radial slit, such as the track TC, the curvature C is set to 0 (indicating that the lines are not curved) at Step S105.

At step S105, the curvature C is set such that the pitch pL of the slit SL of the track T (an example of one track) to be formed is equal to the pitch pL of the slit SL of the track T that has already been formed or the track T to be formed subsequently (an example of another track T). After the processing at Step S105 is performed, the system control goes to Step S107.

At Step S107 (an example of a slit formation step), a plurality of slits SL are formed in the origin detection area h with a predetermined width w along the curved lines LINE 2 set at Step S105. Subsequently, the system control goes to Step S109.

At Step S109, it is determined whether the slit SL is formed in all the desired origin detection areas h (or the tracks T). If there is an origin detection area h (or a track T) in which no slit SL is formed yet, the system control is returned to Step S101. By contrast, if all the slits SL are formed, the system control goes to Step S111.

At Step S111 (an example of a mask arrangement step), the detecting unit 130 including the mask 120 is arranged for two or more tracks T and origin detection areas h having at least the same pitch pL such that the gaps g between the rotating grating L and the fixed gratings G1 and G2 are equal to one another.

Simultaneously or almost simultaneously with the processing described above, processing for connecting the rotating shaft 101 to the disk 110, processing for connecting each detecting unit 130 to the position data generating unit 140 and the origin signal generator 141, processing for housing each component in a case in a manner fixed or supported rotatably, and other processing are performed, thereby completing the encoder 100. However, detailed explanations of these processing will be omitted.

1-5. Example of Advantageous Effects of Rotary Encoder System According to First Embodiment The explanation has been made of the rotary encoder, the rotary motor, the rotary motor system, the disk, and the method for manufacturing the rotary encoder according to the first embodiment of the present invention.

With the encoder 100 and the like according to the present embodiment, the slits SL in at least one origin detection area h are formed as curved slits along the curved lines LINE 2. In the curved slits, the pitch pL can be adjusted with the area division number n fixed to a desired value by adjusting the curvature C of the curved line LINE 2. Therefore, it is possible to improve the flexibility in designing, development, and the like.

In the curved slit used for the encoder 100 and the like, the length of every slit SL can be extended by the length corresponding to the curvature C. As a result, it is possible to reduce the change amount of the pitch pL of the slit SL in the direction of formation of the slit. This means that it is possible to make the pitch pL of the slit SL uniform in the direction of formation of the slit, that is, it is possible to make the slit serving as a curved slit more similar to a parallel slit. The encoder 100 according to the present embodiment uses the diffraction interference optical system with the curved slit. In the diffraction interference optical system, as the slits SL are more similar to parallel slits, the S/N ratio of a detection signal and other elements can be improved, and the detection accuracy can be improved. Because the encoder 100 according to the present embodiment uses the curved slits to make the slits SL more similar to parallel slits, it is possible to improve the S/N ratio of the detection signal and other elements and to improve the detection accuracy.

Therefore, with the encoder 100 according to the present embodiment, it is possible to improve the detection accuracy using diffraction interference light. In addition, the diffraction interference optical system can be designed and developed such that restrictions are reduced in designing and developing of the diffraction interference optical system to facilitate manufacturing thereof, for example.

If the present embodiment is applied to the incremental encoder 100 as in the present embodiment, by using the curved slit in one or more origin detection areas h, it is possible to make the pitches pL in two or more origin detection areas h or tracks T equal to one another. As a result, it is possible to make the gaps g between the detecting units 130 (that is, the masks 120) and the origin detection areas h or the tracks T equal to one another. Therefore, a nearly identical diffraction interference optical system can be designed and developed for the origin detection areas h and the tracks T, for example. In addition, the gaps g for the detecting units 130 corresponding to the origin detection areas h and the tracks T can be adjusted simultaneously. Therefore, it is possible to significantly facilitate designing, development, and manufacturing, for example.

2. Second Embodiment

Figure 10A:
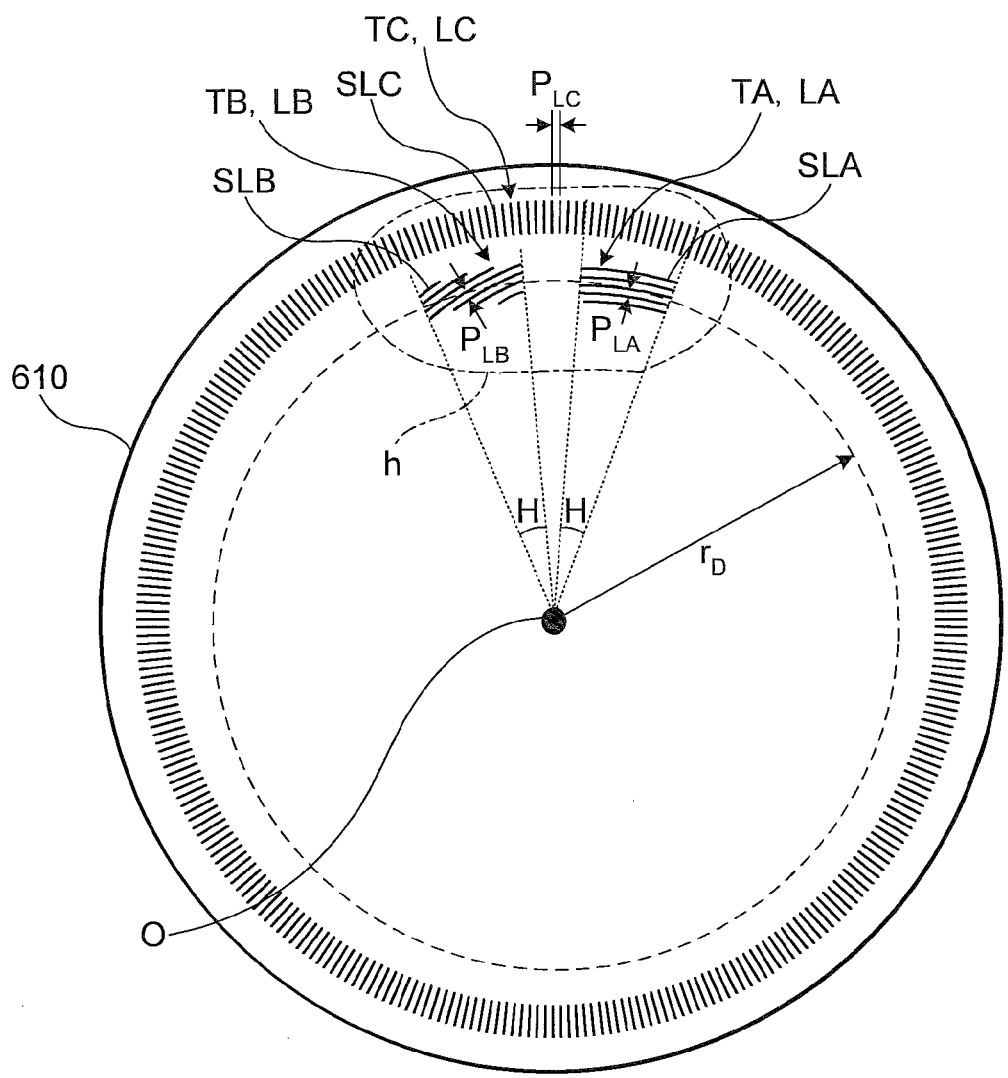
FIG. 10A is a view for explaining a disk provided to a rotary encoder according to a second embodiment of the present invention.
Figure 10B:
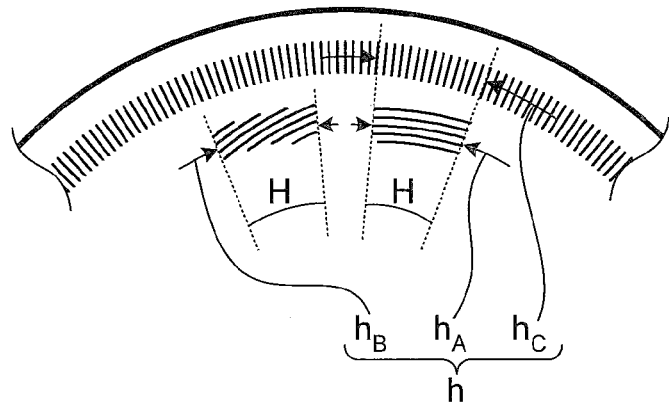
FIG. 10B is a view for explaining the disk provided to the rotary encoder according to the embodiment.

A rotary motor system according to a second embodiment of the present invention will now be described with reference to FIG. 10A. FIG. 10A is a view for explaining a structure of a disk provided to a rotary encoder according to the second embodiment of the present invention.

In the first embodiment of the present invention, the explanation has been made of the case where the tracks TA and TB formed as curved slits have different track radii r (rA<rB) as illustrated in FIG. 3A. The present invention, however, is not limited to the example, and the track radii r of the tracks TA and TB can be equal to each other. In the description below, as the second embodiment of the present invention, an explanation will be made of the case where the track radii r of the tracks TA and TB are formed equal to each other. The encoder and other components according to the present embodiment can be configured in the same manner as in the first embodiment other than that the track radii r of the tracks TA and TB are formed equal to each other. For this reason, differences from the first embodiment will be mainly explained.

As illustrated in FIG. 10A, a disk 610 provided to the encoder according to the present embodiment includes a track TA and a track TB similarly to the first embodiment.

The formation positions of the track TA and the track TB are different from the positions illustrated in FIG. 3A. The track TA and the track TB are formed at positions adjacent to each other in the circumferential direction on the same track radius rD.

By contrast, if the tracks are formed in the radial direction as illustrated in FIG. 3A, the area of the tracks in the radial direction of the disk increases in accordance with the track width and the track number, whereby designing and development of the disk shape may be restricted.

In such a case, by setting the track radii r of the tracks TA and TB equal to each other as in the present embodiment, the area of the tracks in the radial direction of the disk can be reduced. As a result, it is possible to facilitate designing and development of a small-sized disk shape.

It goes without saying that the present embodiment can also provide other special advantageous effects and the like provided by the first embodiment.

3. Third Embodiment

Figure 11A:
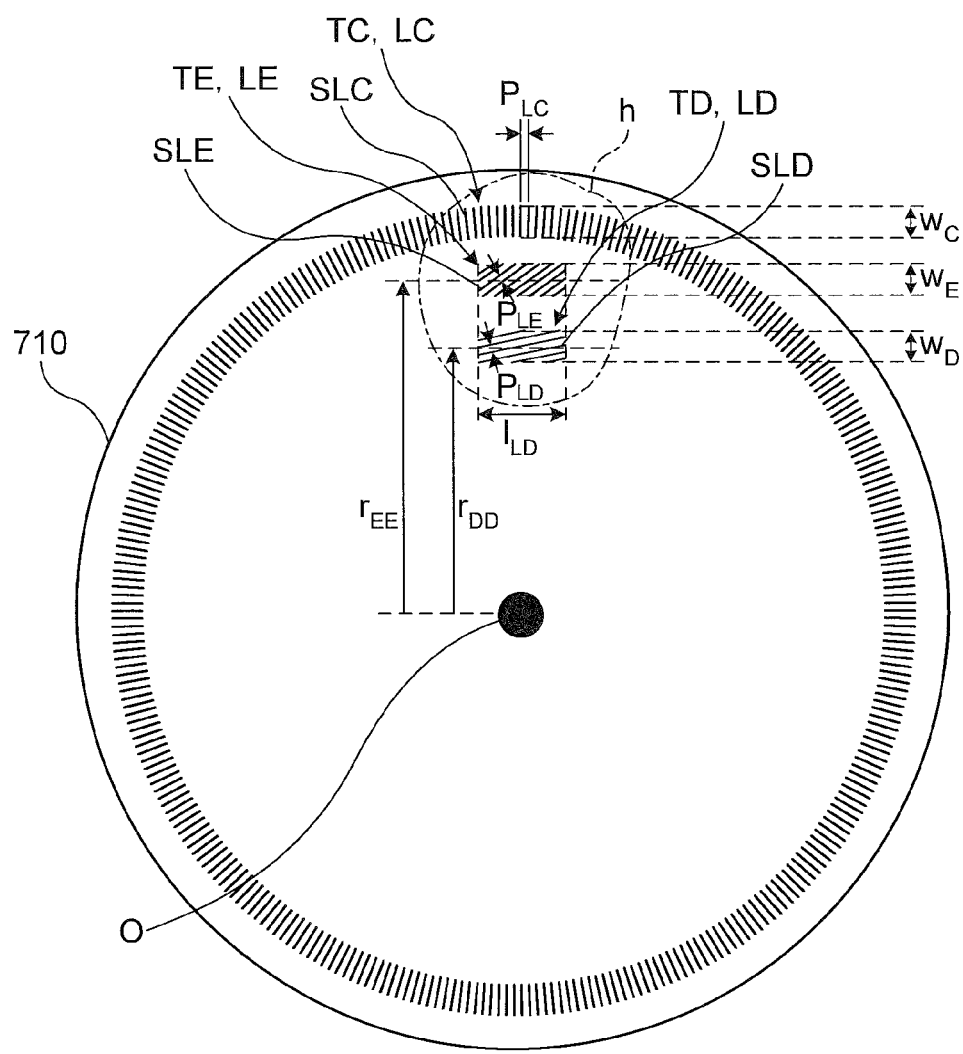
FIG. 11A is a view for explaining a disk provided to a rotary encoder according to a third embodiment of the present invention.
Figure 11B:
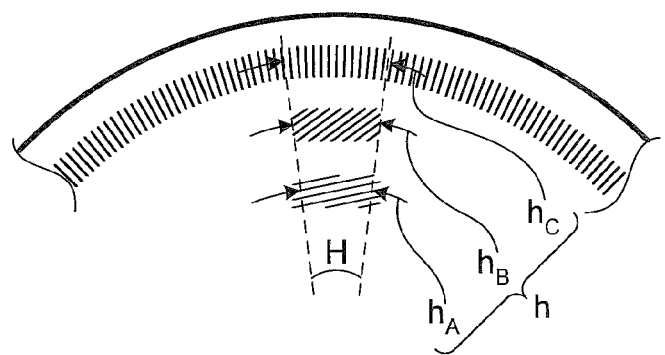
FIG. 11B is a view for explaining the disk provided to the rotary encoder according to the embodiment.

A rotary motor system according to a third embodiment of the present invention will now be described with reference to FIG. 11A. FIG. 11A is a view for explaining a structure of a disk provided to a rotary encoder according to the third embodiment of the present invention.

In the first and the second embodiments of the present invention, the explanations have been made of the case where curved slits are used for the slits SLA and SLB of the tracks TA and TB as an origin detection mechanism. Because the origin detection mechanism only needs to be capable of detecting an origin signal with accuracy obtained by a specified slit pitch, the slits SLA and SLB are not limited to curved slits. In the description below, as the third embodiment of the present invention, an explanation will be made of the case where inclined slits are used instead of the curved slits. The components other than the slits SLA and SLB can be configured in the same manner as in the first embodiment or the second embodiment. For this reason, differences from the first and the second embodiments will be mainly explained.

As illustrated in FIG. 11A, a disk 710 provided to the encoder according to the present embodiment includes tracks TD and TE instead of the tracks TA and TB illustrated in FIG. 3A. In the present embodiment, the tracks TD and TE are formed in a band shape as illustrated in FIG. 11A.

While origin detection areas h in the tracks TD and TE are set to the same width lLD in the circumferential direction, the origin detection areas h may have different widths. The tracks TD and TE have a width wD and a width wE, respectively, equal to each other. While a width wC, the width wD, and the width wE of the tracks TC, TD, and TE, respectively, are set to the same width w (w=wC=wD=wE), the widths may be different from one another.

The tracks TD, TE, and TC are arranged such that positions at the center of the widths w in the radial direction (track radii rDD, rEE, and rC) are different from one another. In other words, the tracks TD, TE, and TC are arranged from the disk center O toward the outer periphery in order of TD, TE, and TC (rDD<rEE<rC).

The tracks TD and TE have rotating gratings LD and LE including a plurality of inclined slits SLD and SLE, respectively.

The inclined slits SLD and SLE are formed with slit pitches pLD and pLE, respectively. The slit pitches pLD and pLE are preferably set equal to a pitch pLC of a slit SLC (pL=pLC=pLD=pLE). The numbers of inclined slits SLD and SLE are set so as to obtain a periodic signal of the periodic number capable of detecting an origin in the same manner as in the first embodiment and the like. The inclination angles (degrees) of the inclined slits SLD and SLE are set such that slits of the number described above are formed in the origin detection area h and that the pitch pLC is set to the value described above. In FIG. 11A, the number of inclined slits PLE is larger than the number of inclined slits PLD. To set both the pitches to the pitch pLC, the inclined slit SLE is formed in a manner inclined with respect to a radial line at an inclination angle smaller than that of the inclined slit SLD.

With this configuration, two diffraction interference optical systems according to the present embodiment can also detect the origin L signal and the origin H signal described in the first embodiment. It goes without saying that the present embodiment can also provide other special advantageous effects and the like provided by the first embodiment.

The inclined slit according to the present embodiment is formed in nearly the same manner as in the method for producing the curved slit illustrated in FIG. 9. However, because processing at Step S105 is different, the processing at Step S105 will be described.

To form an inclined slit, an inclination angle is set such that the pitch pL of the inclined slit is a desired value in accordance with the number of slits SL at Step S105. The inclination angle is set such that the pitch pL of the slit SL in the origin detection area h to be formed is equal to the pitch pL of the slit SL of the origin detection area h or the track T that has already been formed or to be formed subsequently (an example of another track T).

In the present embodiment, because the track is formed by the simple inclined slit without using the curved slit, designing and development of the disk are facilitated compared with the encoders and the like according to the first and the second embodiment.

4. Fourth Embodiment

Figure 12A:
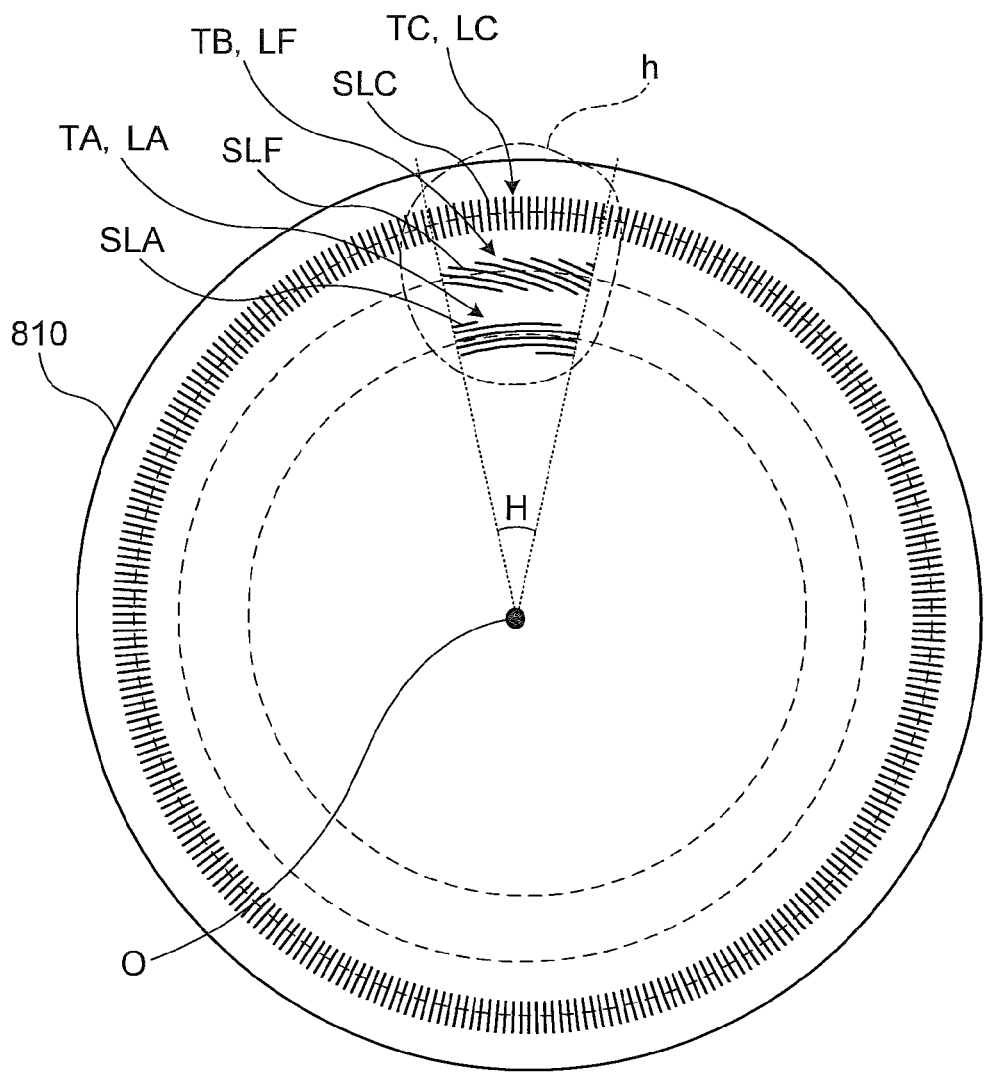
FIG. 12A is a view for explaining a disk provided to a rotary encoder according to a fourth embodiment of the present invention.
Figure 12B:
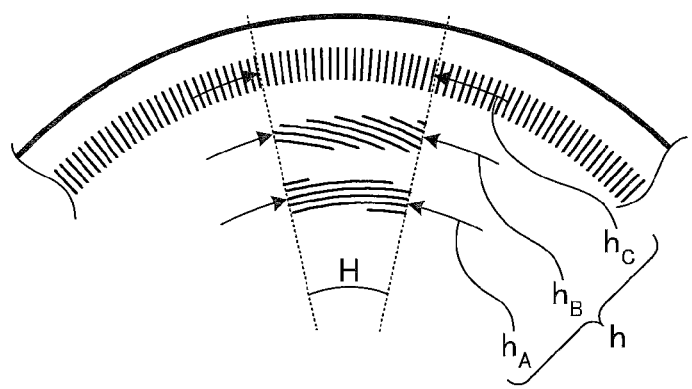
FIG. 12B is a view for explaining the disk provided to the rotary encoder according to the embodiment.

A rotary motor system according to a fourth embodiment of the present invention will now be described with reference to FIG. 12A. FIG. 12A is a view for explaining a structure of a disk provided to a rotary encoder according to the fourth embodiment of the present invention.

In the first embodiment of the present invention, the explanation has been made of the case where directions to curve the slits SLA and SLB of the tracks TA and TB formed as curved slits are the same circumferential direction as illustrated in FIG. 3A. The present invention, however, is not limited to the example, and the curve directions of adjacent tracks (that is, origin detection areas) may be set opposite to each other in the circumferential direction. In the description below, as the fourth embodiment of the present invention, an explanation will be made of the case where the curve directions of adjacent tracks are set opposite to each other in the circumferential direction. The encoder and other components according to the present embodiment can be configured in the same manner as in the first embodiment other than that the curve directions of the tracks are set opposite to each other in the circumferential direction. For this reason, differences from the first embodiment will be mainly explained.

As illustrated in FIG. 12A, a disk 810 provided to the encoder according to the present embodiment includes a rotating grating LF instead of the rotating grating LB illustrated in FIG. 3A on a track TB (an example of at least one track). The rotating grating LF includes a plurality of slits SLF.

Unlike the slit SLB illustrated in FIG. 3A, the curve direction of the slit SLF is set opposite to the curve direction of a slit SLA of an adjacent track TA (an example of another track) in the circumferential direction. In other words, the slit SLA is formed along a curved line LINE 2 obtained by curving a radial line LINE 1 in the clockwise direction, whereas the slit SLF is formed along a curved line obtained by curving the radial line LINE 1 in the anticlockwise direction.

Diffraction interference light output from the slits SL forms interference fringes repeating in a direction nearly perpendicular to the longitudinal direction of the slits SL. The longitudinal direction of the slit SL serving as a curved slit comes closer to the circumferential direction from the radial direction of the disk by being curved. Therefore, the interference fringes may possibly be formed in a manner repeating in a direction of an adjacent track. As a result, crosstalk may possibly occur between the interference fringes and a diffraction interference optical system of the adjacent track. To prevent crosstalk, designing and development of the encoder may possibly be restricted.

In such a case, by setting the curve directions of the slits SLA and SLF of the adjacent tracks TA and TB opposite to each other as in the present embodiment, the direction in which the interference fringes are formed can be changed. As a result, it is possible to facilitate designing and developing of the encoder that can prevent crosstalk.

It goes without saying that the present embodiment can also provide other special advantageous effects and the like provided by the first embodiment.

While the embodiments of the present invention have been described in detail with reference to the accompanying drawings, it goes without saying that the scope and spirit of the present invention are not limited to the embodiments described herein. It is obvious to those ordinarily skilled in the art of the present invention that various changes, modifications and combination may be made without departing from the spirit and scope of the present invention disclosed in the accompanying claims. Therefore, the technology obtained by the changes, the modifications, and the combinations would fall within the scope and spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotary encoder comprising:
   a disk in a disk shape that is arranged rotatably about a rotation axis and that includes one or more tracks in a ring shape on which an optical rotating grating is formed on whole circumference and one or more origin detection areas serving as partial areas on which an optical rotating grating is formed and that are offset from the rotation axis; and
   a mask that is fixed and arranged in a manner facing the disk and on which two or more optical fixed gratings capable of constituting a diffraction interference optical system together with each of the rotating grating of the tracks and the rotating grating of the origin detection areas are formed, wherein
   a plurality of slits included in the rotating grating of the origin detection areas are inclined slits formed in a manner inclined in a circumferential direction with respect to radial lines about the rotation axis or curved slits curved in the circumferential direction with respect to the radial lines about the rotation axis.

2. The rotary encoder according to claim 1, wherein a plurality of slits included in the rotating grating of the origin detection areas are formed such that a pitch between the slits is equal to a pitch between a plurality of slits included in the rotating grating of the tracks.

3. The rotary encoder according to claim 1, further comprising an origin signal generator configured to generates an origin signal indicating an origin position of the disk based on a periodic signal obtained partially in a single rotation of the disk from the diffraction interference optical system including the rotating grating of the origin detection areas and on a periodic signal obtained over the whole circumference in the single rotation from the diffraction interference optical system including the rotating grating of the tracks.

4. The rotary encoder according to claim 1, wherein
   the slits of the origin detection areas formed as the curved slits are each formed along a curved line obtained by curving each of the radial lines in the circumferential direction at predetermined curvature such that the pitch between the slits is equal to the pitch between the slits of the tracks.

5. The rotary encoder according to claim 4, wherein
   the disk includes two or more origin detection areas, and
   the curvature with respect to the radial line in the slits of a first one of the origin detection areas is set to a different value from curvature with respect to a radial line in a plurality of slits of a second one of the origin detection areas such that the pitch between the slits is equal to a pitch between the slits of the second one of the origin detection areas.

6. The rotary encoder according to claim 5, wherein a curve direction in the slits of the first one of the origin detection areas is a curve direction opposite to a curve direction in the slits of the second one of the origin detection areas.

7. The rotary encoder according to claim 5 or 6, wherein the first one of the origin detection areas and the second one of the origin detection areas are set side by side in the circumferential direction.

8. The rotary encoder according to claim 4, wherein the fixed grating corresponding to the origin detection areas on which the slits are formed along the curved line is formed in a manner parallel to a tangent to the curved line.

9. The rotary encoder according to claim 1, wherein a gap between the rotating grating of the origin detection areas and the fixed grating corresponding to the rotating grating is equal to a gap between the rotating grating of the tracks and the fixed grating corresponding to the rotating grating.

10. The rotary encoder according to claim 1, wherein
    the slits included in the rotating grating of the tracks and the rotating grating of the origin detection areas are reflecting slits, and
    two of the fixed gratings corresponding to the rotating grating are arranged on the same surface side of the disk.

11. A rotary motor comprising:
    a motor configured to rotates a rotating shaft; and
    a rotary encoder that is connected to the rotating shaft and configured to measures a position of the rotating shaft, wherein
    the rotary encoder comprises:
    a disk in a disk shape that is arranged rotatably about a rotation axis in association with rotation of the rotating shaft and that includes one or more tracks in a ring shape on which an optical rotating grating is formed on whole circumference and one or more origin detection areas serving as partial areas on which an optical rotating grating is formed and that are offset from the rotation axis; and a mask that is fixed and arranged in a manner facing the disk and on which two or more optical fixed gratings capable of constituting a diffraction interference optical system together with each of the rotating grating of the tracks and the rotating grating of the origin detection areas are formed, wherein a plurality of slits included in the rotating grating of the origin detection areas are inclined slits formed in a manner inclined in a circumferential direction with respect to radial lines about the rotation axis or curved slits curved in the circumferential direction with respect to the radial lines about the rotation axis.

12. A rotary motor system comprising:

a motor configured to rotates a rotating shaft;

a rotary encoder that is connected to the rotating shaft and configured to measures a position of the rotating shaft; and a controller configured to controls rotation of the motor based on the position detected by the rotary encoder, wherein the rotary encoder comprises:

a disk in a disk shape that is arranged rotatably about a rotation axis in association with rotation of the rotating shaft and that includes one or more tracks in a ring shape on which an optical rotating grating is formed on whole circumference and one or more origin detection areas serving as partial areas on which an optical rotating grating is formed and that are offset from the rotation axis; and a mask that is fixed and arranged in a manner facing the disk and on which two or more optical fixed gratings capable of constituting a diffraction interference optical system together with each of the rotating grating of the tracks and the rotating grating of the origin detection areas are formed, wherein a plurality of slits included in the rotating grating of the origin detection areas are inclined slits formed in a manner inclined in a circumferential direction with respect to radial lines about the rotation axis or curved slits curved in the circumferential direction with respect to the radial lines about the rotation axis.

* * * * *